PRINTING TELEGRAPH TRANSMITTER SET

Filed Sept. 17, 1963

9 Sheets-Sheet 1

INVENTOR
ALBERT J. LODENKAMP
BY E. A. Kane
ATTORNEY

Sept. 5, 1967 A. J. LODENKAMP 3,340,354

PRINTING TELEGRAPH TRANSMITTER SET

Filed Sept. 17, 1963 9 Sheets-Sheet 2

CLEARING CIRCUIT

START OF MESSAGE CIRCUIT

STEPPER SWITCH CONTROL CIRCUIT

TRANSMITTER CONTROL CIRCUIT

FIG. 7 CODE READING CIRCUIT

READER ISOLATING CIRCUIT

DISTRIBUTOR CONTROL
CIRCUIT

FIELD INDICATOR CIRCUIT

TODAY, TOMORROW & SKIP CIRCUITS

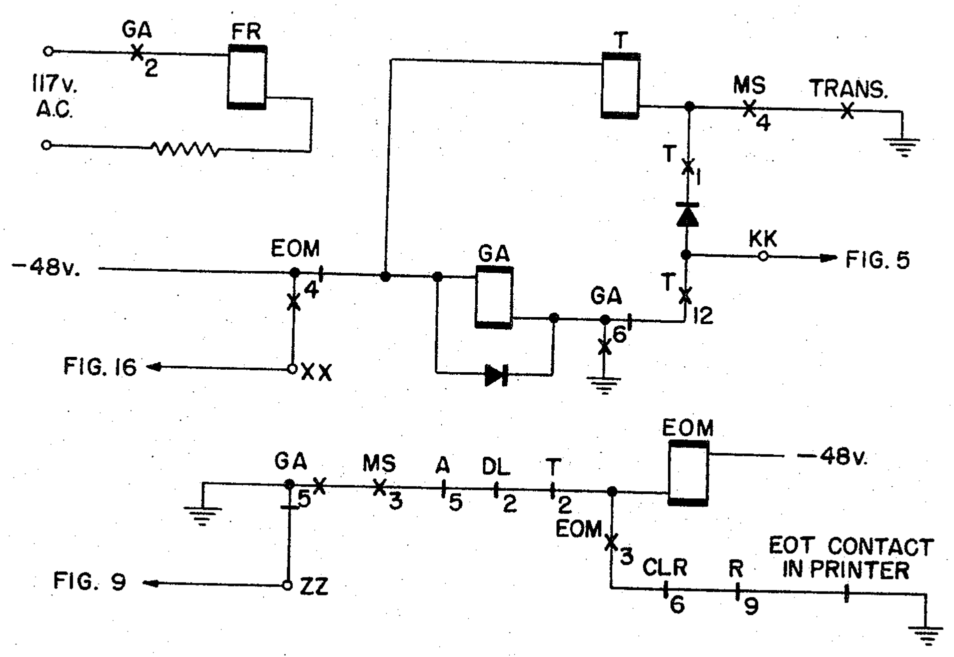
FIG. 12
TRANSMISSION CONTROL CIRCUIT
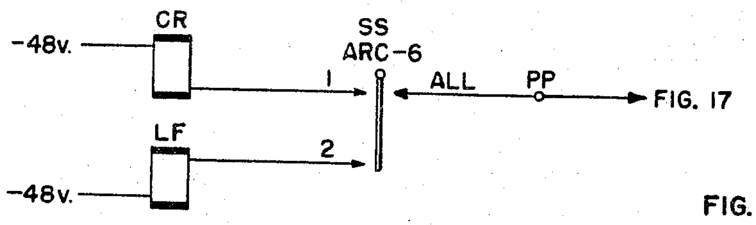
FIG. 13
REPEAT CIRCUIT
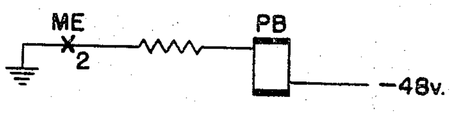
FIG. 14
PUNCH BLIND CIRCUIT
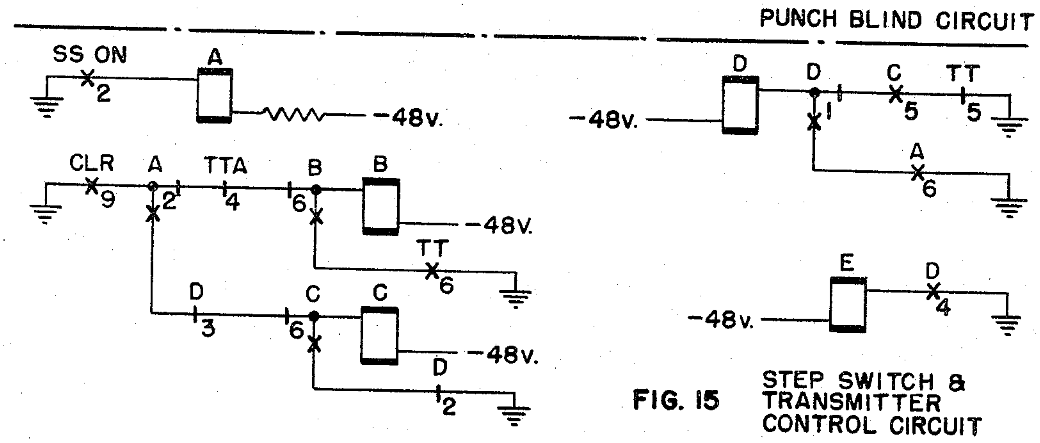
FIG. 15 STEP SWITCH & TRANSMITTER CONTROL CIRCUIT

MESSAGE START & END CIRCUIT

TRANSMITTER & REPEAT CONTROL CIRCUIT

Sept. 5, 1967 A. J. LODENKAMP 3,340,354

PRINTING TELEGRAPH TRANSMITTER SET

Filed Sept. 17, 1963 9 Sheets-Sheet 9

FIELD SELECTOR CIRCUIT

SIGNAL LINE CONTROL CIRCUIT

United States Patent Office 3,340,354
Patented Sept. 5, 1967

3,340,354

PRINTING TELEGRAPH TRANSMITTER SET

Albert J. Lodenkamp, Glen Ellyn, Ill., assignor to Teletype Corporation, Skokie, Ill., a corporation of Delaware Filed Sept. 17, 1963, Ser. No. 309,540
13 Claims. (Cl. 178—4)

ABSTRACT OF THE DISCLOSURE

A keyboard controlled transmitter has facilities for perforating tape under control of a keyboard in a predetermined sectionalized format, each section or field of which has associated therewith a field key, and a local monitor printer provides a visible indication of the information being recorded in the tape. Where the monitor shows incorrect information in any particular field, a field key associated with that portion of the message may be operated; and the information recorded in the tape may be automatically read and repeated in those fields which are correct, with reading of the tape stopping whenever the monitor printer reaches a field having an operated field key to permit insertion from the keyboard of corrections in the fields to be changed. When a correct acceptable format is shown on the monitor, transmission over the line may be initiated under tape control.

It has been proposed to provide an interline air line seat reservations computer center which will store all of the schedules that air line file and will make this information available for use by the various air lines over telegraph communication lines. Thus, a demand has been created for an agents printer telegraph set capable of communicating quickly with a computer center to determine the availability of seats on various flights and on specific days.

The information for handling reservation transactions requires that the agents set be able to transmit information regarding the air line over which passage is sought, the particular flight on which transportation is desired, the class of passage, the day and month on which this transportation is sought, the point of origination of the flight and its destination, the type of inquiry, i.e., selling or cancelling reservations, and the number of seats involved in the transaction. In addition, at times it may be desirable for the agent to transmit information regarding the originating point from which the passenger's flight departed on a connecting line, the air line over which that particular leg of the trip is being flown, the flight number, the class of passage and the day and month. Further, some of the air lines demand that the names of the passengers, involved in the transaction and who will occupy the space sought to be obtained, be supplied. Consequently, this information must also be readily transmittable to the computer center.

At the computer center it is proposed to store information indicating the availability or nonavailability of seats and to handle such transactions as the sale or cancellation of accommodations on the various flights.

It is an object of the present invention to provide a telegraph transmitting set which will readily transmit information in a format recognizable by a computer requesting information or giving information on air line space.

It is another object of the invention to provide a printing telegraph transmitter set for transmitting information in a predetermined format and in segments or fields of this format to record the message to be transmitted on a monitor prior to the transmission of the message to facilitate making corrections in the format where errors have occurred.

A still further object of the invention is the provision of a printing telegraph transmitter set having facilities for pre-recording a message format to be later transmitted in such a manner that any segment of the format having an error therein may readily be corrected by inserting the proper information in the message format in the proper segment thereof.

Yet another object of the invention is to provide a telegraph transmitter set which provides a monitor copy of a message to be transmitted prior to the transmission thereof so that various segments of the message which are correct may be repeated at the transmitter set and the incorrect segments corrected prior to the transmission of the message.

In accordance with one embodiment of the invention a printing telegraph sending set is provided wherein the operation of keys on a keyboard will cause a monitor copy of the information set up under control of the keyboard to be made simultaneously with the perforation of telegraph code combinations in a tape and wherein after a predetermined number of keys on the keyboard have been operated to indicate the information to be transmitted in one particular field of a predetermined format of fields, the printer will automatically insert a space and the field in which the information is being keyboarded will be indicated by lamps associated with that field of selection. As the keyboard is operated to control the printing of the monitor copy and the perforation of the tape with information corresponding to that generated by the keyboard and printed by the monitor, the various field lamps will be lighted in succession to indicate to the operator the field in which he is generating information. If upon examination of the monitor copy of the message to be transmitted an error is noted in one of the fields or segments of the format being set up, the operator may depress the key corresponding to that field and operate a key to cause the tape which had been prepared in the perforating of the original message to be fed through the reader but not transmitted and to control the perforation of a new message in the same tape up to the point in the message format where a field key has been actuated. At this point the operator may keyboard the correct information in that segment and immediately upon completing the keyboarding, the set will automatically initiate a repeat operation to cause the remainder of the information on the monitor copy to be printed again and to cause the tape to be reperforated in a second area of the tape with the corrected information.

In the event that errors are made in setting up the message information in more than one area of the tape, the keys for those fields or segments in which errors have occurred may be actuated and the set will stop at each field where an error has been detected so that the operator may correct one or more fields but need not repeat the keyboarding of any of the information which had been correctly presented the first time. In addition, since some of the air lines might not be interested in the original leg of a flight for which they are expected to provide space for a succeeding leg, information covering the originating line, flight, class, day and month, may be skipped upon the operation of a record locator skip key. Thus, after the necessary information including the line, flight number, class, day, month, point of origin, destination and number of seats has been recorded on the monitor and perforated in the tape, the next group of fields covering the record locator information may be skipped and the monitoring printer will, in fact, perform a tabulating operation to skip those areas of the tape being printed that are associated with the fields of information regarding the origination of the flight and other connections with respect thereto and will space the page printer mechanism to the area allowed for the recordation of the name(s) of the party requesting transportation. In the field where the name or names of the party requesting transportation is to be printed on the monitor copy and transmitted to the computer for recordation, there is no limit to the amount of information that may be transmitted; for example, the information may occupy one, two, three or more lines of printing on the monitor copy.

After the information comprising the entire message has been typed on monitor copy and perforated in the tape, checked for correctness and found to be correct, a key may be operated to cause a tape reader to be connected with a transmission line leading to the computer center to control transmission of the correct message, as perforated in the tape, to the center.

Since, in the scheduling of air line flights, a very large percentage of the flights are scheduled either on the day of the flight or the day immediately preceding the flight, the apparatus of the present invention is equipped with means for entering a symbol in the field of the format covering the day and the month which indicate either that the flight which the attendant or agent is attempting to book will be either today or tomorrow in language which the computer will recognize and while the entering of the day and the month normally requires the operator to actuate a plurality of keys, that is two keys for the day of the month and three keys for the letters of the month, the actuation of either the "today" or "tomorrow" key on the keyboard will cause the entering of the symbol representing these days and will then automatically step through the other character spaces which have to be allowed for the day and the month. After the information has been transmitted to the computer center the operator will wait for a response from the computer indicating acceptance of an order, the nonavailability of the transportation or other information and thereafter may clear the apparatus by operating a clear key to prepare for the transmission of another message to the computer. On the other hand, if the air lines agent operating the set has received information from the computer that the requested transportation is not available, he may, after conferring with the customer, attempt to obtain passage on another flight on the same or an alternate air line. The only items necessary to be changed under these conditions would be the air lines in the first field and on the flight number in the second field or segment of information in the format. In order to do this the operator may actuate the field selection key or keys associated with those particular segments of the format which need to be changed, operate the repeat key, keyboard the information in these fields, and operate the transmit key in an attempt to get passage on a different flight or on an alternate air line on the same day and between the same points.

A more complete understanding of the invention may be had by reference to the following detailed description when considered in conjunction with the accompanying drawings wherein:

FIGS. 3 through 19 are detached circuit schematic views showing, insofar as possible, a complete separate function of the circuitry in each separate figure, which function is described adjacent to the figure number.

GENERAL DESCRIPTION

Figure 4:
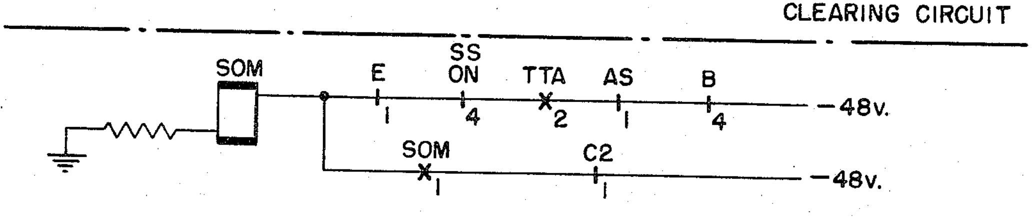

In the description of the circuitry the "detached contact" method of exposition used in Patent No. 2,722,675, granted to J. Michal et al. on Nov. 1, 1955, has been adopted for use. The minor portion of the description relating to the structural feature utilizes the usual method of exposition and need not be mentioned further. In the "detached contact" method of illustrating electrical circuits, relay contacts, generally, are not adjacent to their magnetic cores and windings but are separated or detached therefrom. For example, a core such as the core of a start-of-message relay shown on FIG. 4 is represented by a small rectangle and given a functional designation such as "SOM." In the specification the relay is referred to as "4-SOM," where "4" indicates the figure number of the drawing on which the core is located and "SOM" signifies the start-of-message relay as the functional designation of the relay. To the extent possible the relays and magnets are given letter designations which are mnemonics of the function of the relay. On the drawing each of the contacts controlled by the relay is given a designation such, for example as, "SOM–2" placed in proximity to the contacts where "SOM" indicates that the contacts are controlled by the winding of relay "SOM." In the specification the contacts are referred to as "5–4–SOM–3" where "5" gives the figure number on the drawing on which the contacts are located; "4" indicates the figure number on the drawing on which the core is located; "SOM" is the functional (possibly the mnemonic) designation; and "3" is the contact number.

Contacts which are closed when the relay is deenergized, known as "break" contacts are represented by a short line perpendicular to the line representing the conductor, while contacts which are closed when the relay is energized, known as "make" contacts are represented by two short crossed lines diagonally intersecting the line representing the conductor. The contacts in the perforator and reader are designated in a manner similar to that used in designating relay contacts. Rotary selector switches are shown with their operating coils and cores illustrated in the same manner as the coils of relays, with their interrupter and off-normal switches shown in a manner similar to that used in connection with the relays, whereas the common brush or rotor of the rotary selector switch is in each case designated "ALL," and the various contacts with which the rotor or brush will engage in stepping across the row of contacts associated with it are given reference numbers indicating that certain of the separate contacts in the particular row or arc are interconnected one to another. For example, in FIG. 9 the selector switch SS–ARC–3 has its contacts 14, 16 to 18 and 46 to 49 interconnected or strapped together. This stepper switch is of the type which steps its wipers or brushes when the operating magnet is released or deenergized. This switch opens its interrupter contacts each time it is deenergized and closes its off normal contacts in all except the home or normal position. Similarly, the normally open and normally closed contacts of keys or push buttons are shown in a manner similar to that used in designating relay contacts. The other circuit components are shown in the conventional manner employed heretofore.

In some instances, where the complete function of a circuit cannot be shown in a single figure, due to the fact that there is an interaction between its functional operation and the functional operation of other portions of the apparatus, a terminal may be shown by a very small circle with a reference letter and indicating the figure on which the continuation of this circuit may be presented.

Since in many instances, the detached contact method of exposition results in a drawing where the circuit elements have no apparent physical connection one with the other it is to be assumed that all of the subject matter appearing within the confines of a single sheet of patent drawing constitute a single patent figure unless otherwise indicated. When the subject matter on a sheet of patent drawing includes more than one figure, the subject matter of each figure will be enclosed within light broken lines and will be identified by a separate figure number.

Figure 1:
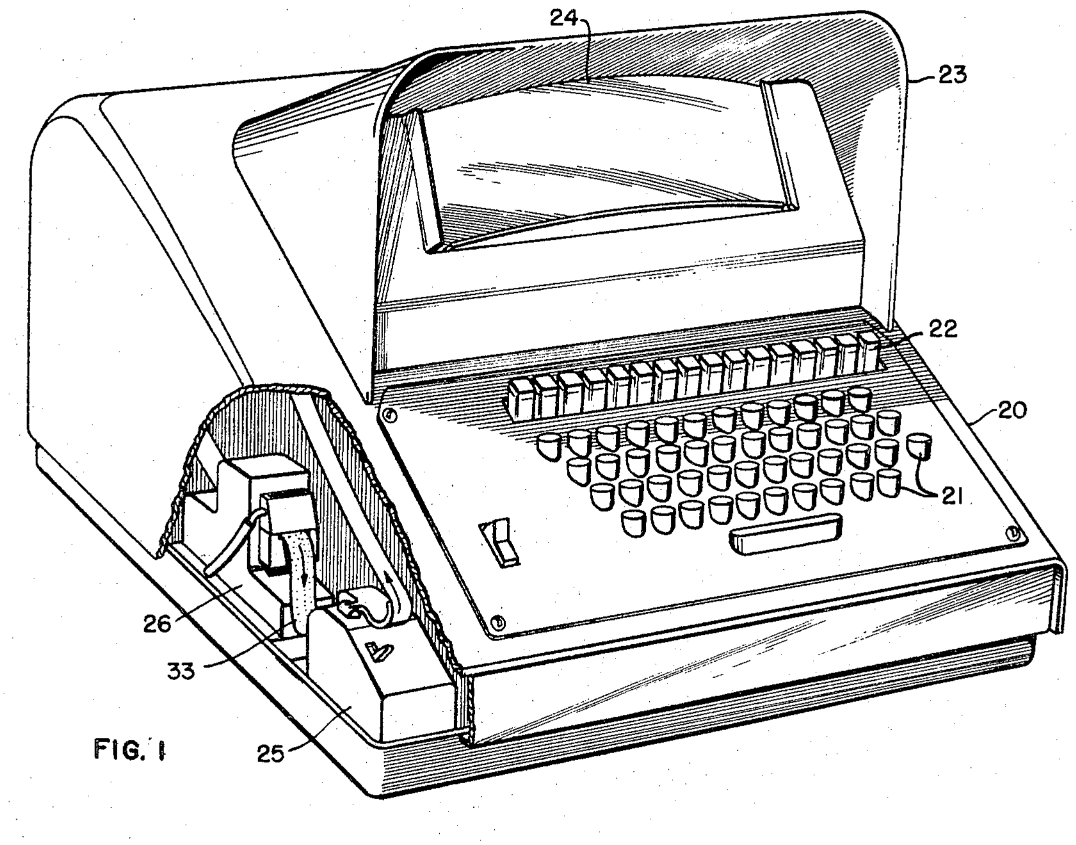
FIG. 1 is a perspective view of a transmitter set for use by an air lines agent, portions being broken away to show diagrammatically a tape perforator and a tape reader mounted within the case of the set.
Figure 2:
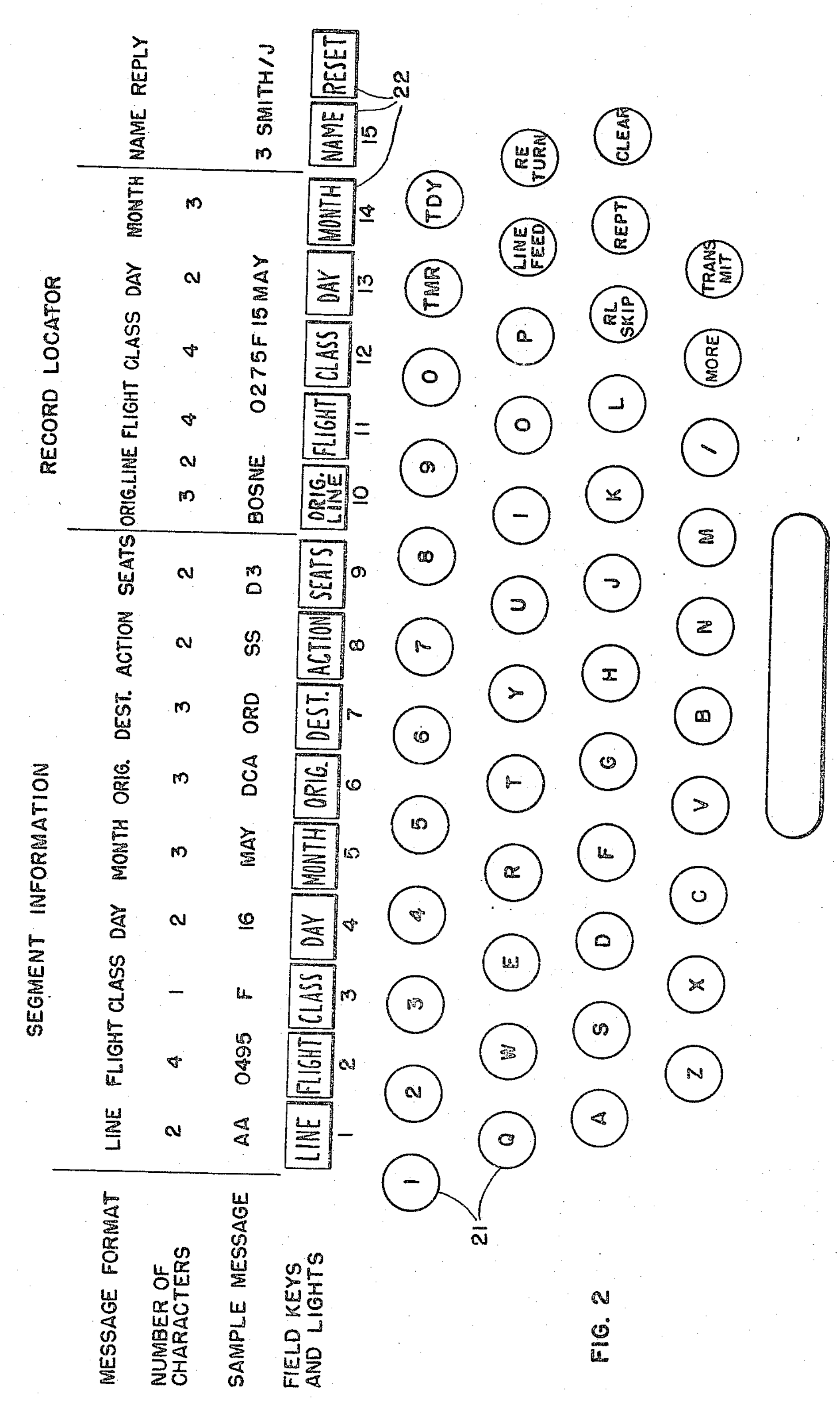
FIG. 2 is a diagrammatic view illustrating the message format and the relative location of the field selection keys and keys on the keyboard of the set to be utilized by an agent in generating a message or inquiry.

Referring now to FIG. 1 of the drawing wherein the general outline of the apparatus is delineated, it will be seen that there is provided a telegraph transmission set or air line agent set in the form of a page printer which includes a keyboard 20 having mounted on it suitable character and function controlling keys 21. Where these keys directly control specific operating characteristics of the circuitry they will be designated on the circuit drawings as described hereinbefore. In addition to these character and function controlling keys 21, the keyboard is equipped with a row of keys 22 of the general type shown in the patent to W. E. Dumke et al. No. 2,935,577, issued May 3, 1960, except that the keys may be released either by the operation of an electromagnet or mechanically upon the operation of a reset button 22. In addition, each of the keys of this line of keys which are illustrated in FIG. 2 and designated with functional designations, has a light for illuminating it, under control of circuitry to be described hereinafter.

The transmitter page printer set has a cowl or light shield 23 mounted on it to shade a magnifying glass 24 through which the matter printed by the page printer monitor portion of the set may be viewed by an operator. Within this cowl or light shield and immediately above the next to the last line of printed matter printed by the monitor printer is a diagram corresponding to the layout of the keys 22 shown on FIG. 2. In the upper portion of FIG. 2 under the designation "Message Format," which is broken into two separate parts designated "Segment Information" and "Record Locator," there is a duplication of the information which is permanently displayed above the next to the last line of printed matter printed by the set. This transmitter set, with the exception of the row of keys 22 and several special keys, as illustrated in FIG. 2, may be of any suitable type but as shown corresponds to a printing telegraph automatic send-receive set of the type illustrated in the copending applications of L. C. Anderson, Jr., et al., Ser. No. 159,234, filed Dec. 14, 1961, A. A. Hagstrom, Ser. No. 159,240, filed Dec 14, 1961 and W. J. Zenner, Ser. No. 159,330, filed Dec. 14, 1961. The keyboard 20 is of the type shown in the L. C. Anderson, Jr., et al. application. The main body of the printer is of the type illustrated in the W. J. Zenner application which is operated in conjunction with the structure of the A. A. Hagstrom application. The reader which is mounted as shown diagrammatrically at 25 in FIG. 1 is preferably of the type shown in the copending application of L. C. Anderson, Jr., et al., Ser. No. 231,199, filed Oct. 17, 1962 and the perforator portion 26 diagrammatically illustrated in FIG. 1 is preferably of the type shown in the copending application of G. Sim et al., Ser. No. 217,458, filed Aug. 16, 1962.

The information which is to be transmitted to a computer center includes:

Identification of the air lines, expressed in two characters;

Identification of the flight number, expressed in four characters;

The class of transportation desired, expressed in one character;

The day of the month on which the transportation is requested, expressed in two characters;

The month, expressed in three characters;

The originating point from which this flight or leg of the flight begins, expressed in three characters;

The airport destination of this leg of the flight, expressed in three characters;

The account which the computer is to check, expressed in two characters; and

The number of seats required, expressed in two characters.

This information is diagrammatically illustrated in FIG. 2 under the heading "Segment Information" and unless the segment information is in a proper format as indicated by the sample message shown on FIG. 2, the computer will reject the information since it cannot process it. Consequently, the format of the messages to be transmitted by this agent set is fixed through this portion of the message to be transmitted.

It may be desirable to furnish the air line, on which passage is being sought, with information regarding previous legs of a flight of which the passage being requested forms only a part. When this information is required, the information may be transmitted in the format shown by the sample message under the heading "Record Locator." Here the point of origination of the previous leg of the flight will be entered by the air lines agent using three letters; the line on which that leg of the flight was to be made using two characters; the number of the flight using four characters; the class of the flight using one character; and the day and month of the flight using two and three characters, respectively. This information may or may not be transmitted to the computer and if it is desired not to send this information to key RL shown in FIG. 2 may be operated. The operation of this key will cause the monitoring printer to effect a tabulating type of operation as soon as the number of seats under the segment operation has been set up on the monitor. In the area designated "Name" the name or names of passengers or any other pertinent information may be typed on the monitor printer either in the small area left on the line or running over onto two, three or more lines.

Figure 20:
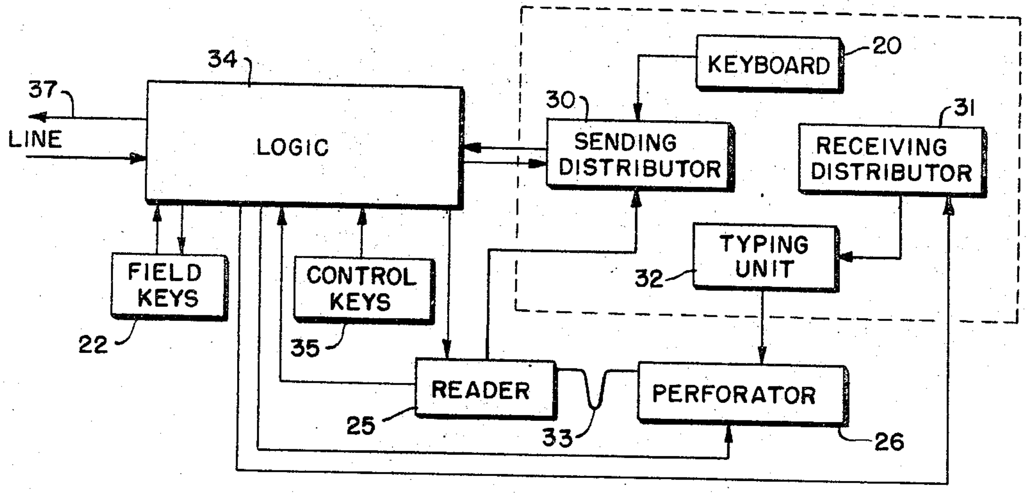
FIG. 20 is a block diagram showing the main elements of the set and the manner in which they are interconnected.

The general arrangement of the apparatus is illustrated in the block diagram shown in FIG. 20 wherein the monitor printer includes a keyboard 20 which controls the operation of a sending distributor 30. This sending distributor 30 may be of the usual type but preferably comprises the distributor illustrated in the application of W. J. Zenner, Ser. No. 159,330, filed Dec. 14, 1961 which sequentially transmits signals as set up by contacts operated under control of the keyboard 20.

In the present transmitter set this sending distributor also may be operated under control of the reader 25 and transmits over the transmission line through the circuit logic as illustrated in the detailed circuit drawings in FIGS. 3 to 19. The information set up on the keyboard 20 will be transmitted by the sending distributor through the circuit logic to a receiving distributor 31 in the monitor printer which comprises the selector magnet and associated parts which control the operation of a typing unit 32. All of these elements may be of any usual type but preferably are of the type disclosed in the aforementioned application of W. J. Zenner. The typing unit 32 in the monitor printer controls the perforator 26 so that any information typed by the typing unit 32 will also be set up in permutation code on tape 33 by the perforator 26. The circuit logic 34 operates under control of the sending distributor 30, the reader 25, control keys 35 and the field keys 22 to control the information printed by the typing unit 32, and encoded in the tape 33 by the perforator 26. The circuit logic 34 also controls some of the operations of the reader 25, perforator 26 and the signals transmitted over the telegraph line 37.

CLEARING OPERATION

In describing the arrangement and operation of the apparatus it is believed that it will be more readily understood if it be assumed that in the first instance the apparatus has been left in a condition other than complete readiness for use by an agent in transmitting a request to a computer center for transportation. Consequently, the apparatus must be cleared and restored to its ready condition before it may be used. In order to clear the apparatus, the agent may operate the nonlocking clearing key 3–CLR to close its contacts and connect ground in FIG. 3 through the winding of clear relay 3–CLR to −48 volt DC source in FIG. 3. When relay 3–CLR is operated it will lock operated through its own make contacts 3–CLR–1 and the closed break contacts 3–4–SOM–2 to ground in FIG. 3.

Figure 8:
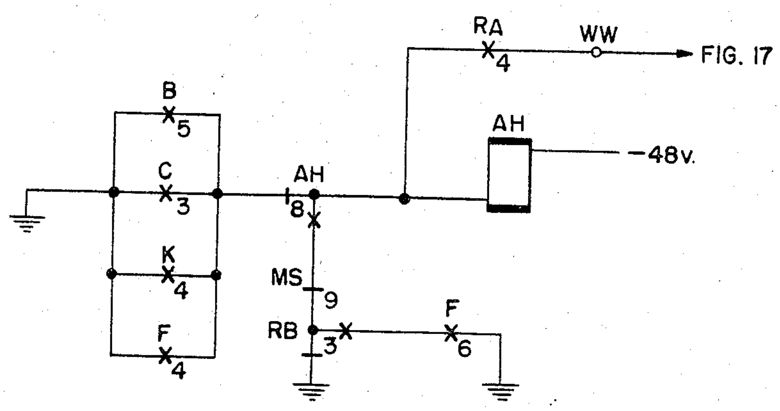
Figure 18:
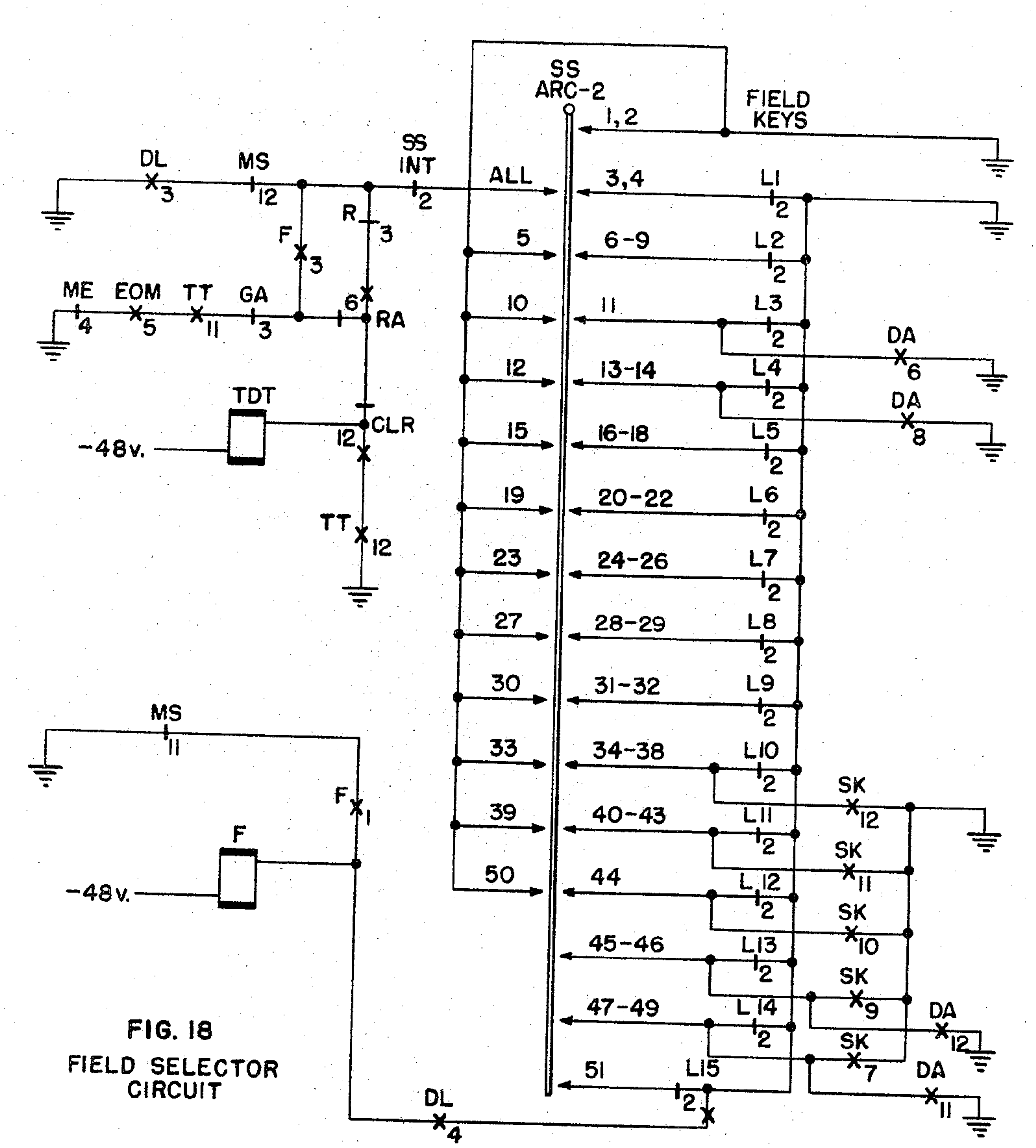
Figure 19:
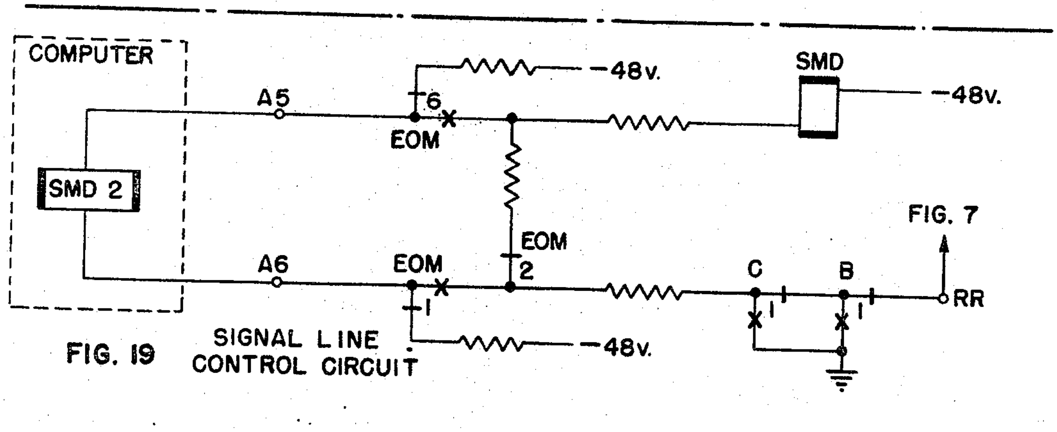

Since it has been assumed that the apparatus was not in its normal, ready condition, relay 15–A in the stepper switch and transmitter control circuit will be energized in a path from ground (FIG. 15) through now closed off-normal contacts 15–5–SS–ON–2 of the stepper switch and the winding of relay 15–A to −48 volt DC source in FIG. 15. At this time, the taut-tape relay 6–TT in the transmitter control circuit will also be operated since the normal condition of switch 6–TO–TT is closed. With the taut-tape relay 6–TT operated, the operation of clear key 3–CLR and consequent energization of relay 3–CLR will complete a circuit from ground (FIG. 18) through now closed make contact 18–6–TT–12, now closed make contacts 18–3–CLR–12 and the winding of a transmitter distributor trip magnet 18–TDT to −48 volt DC source (FIG. 18). Operation of the clear relay 3–CLR will also complete a circuit from ground in FIG. 15 through the now closed make contacts 15–3–CLR–9, now closed make contacts 15–A–2, now closed break contacts 15–D–3, now closed break contacts 15–C–6 and the winding of relay 15–C to −48 volt source in FIG. 15. This will cause the energization of the C relay in the stepper switch in transmitter control circuit and this relay 15–C will lock up through its own make contacts 15–C–6 and the break contacts 15–D–2 to ground. When the control relay 15–C is thus energized and locked energized it will complete a circuit from ground in FIG. 8 through its make contacts 8–15–C–3, now closed break contacts 8–AH–8 and the winding of relay 8–AH to −48 volt DC source in FIG. 8. This relay 8–AH is a reader isolating relay and upon energization will lock energized in a path from ground (FIG. 8) through now closed break contacts 8–17–RB–3, 8–16–MS9, its own make contacts 8–AH–8 which are now closed and the winding of the relay 8–AH to the −48 volt DC source (FIG. 8).

Figure 7:
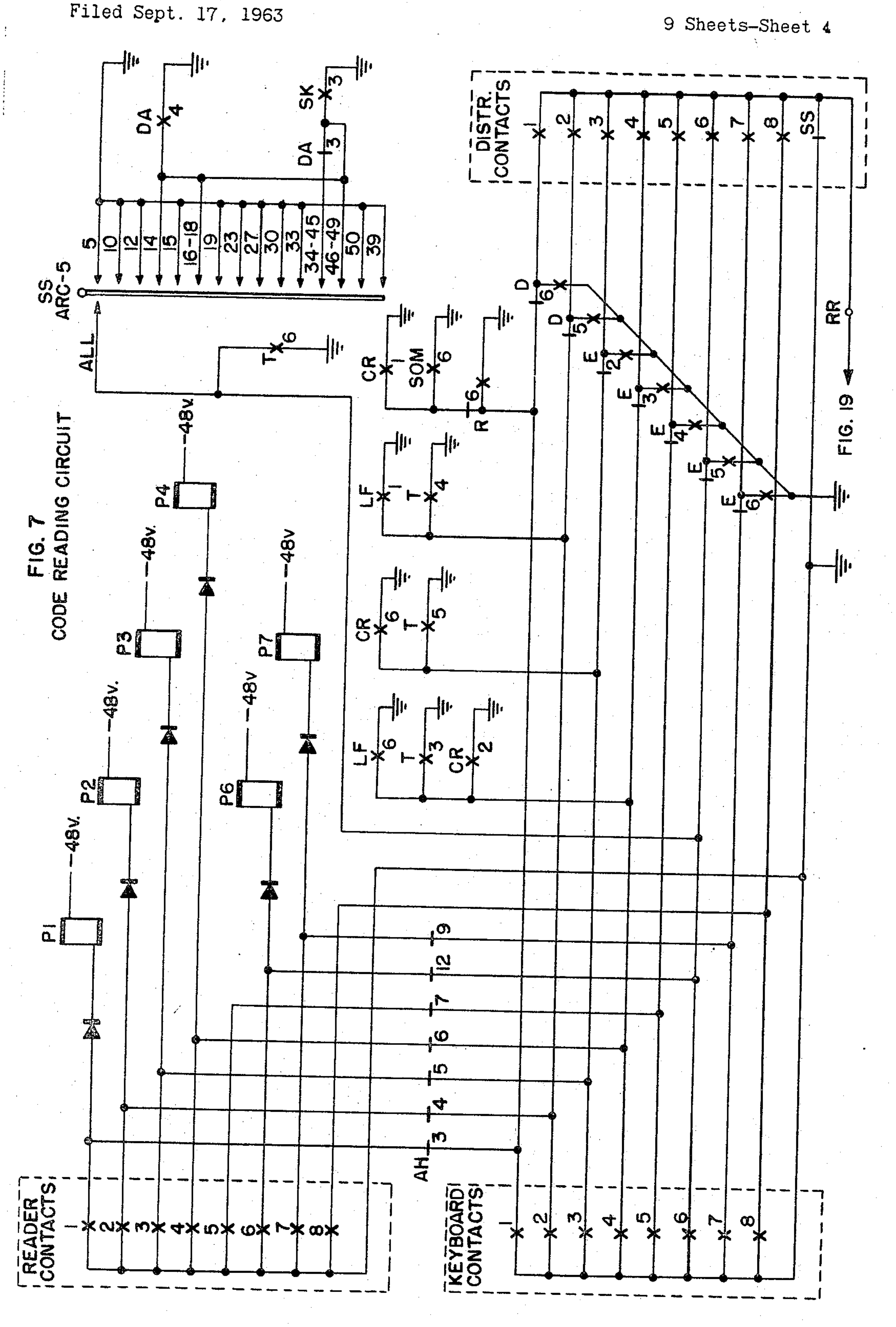

With the circuit in this condition, the operation of the transmitter distributor trip magnet 18–TDT will cause the reader to advance tape through it but the page printer and transmission line will not be operated due to the fact that the energization of relay 8–AH opened all of the contacts 7–8–AH–3, 4, 5, 6, 7, 12 and 9, thus isolating the reader contacts from the distributor contacts shown in the code reading circuit on FIG. 7. With this condition prevailing, tape which had been perforated by the perforator will be drawn into and through the reader 25 until the tape gets taut between the perforator 26 and reader 25 at which time the tape will cause the opening of taut-tape contact 6–TO–TT. This operation is the usual operation where a transmitter distributor is controlled by a tape reader to which tape is fed from a perforator.

When tape is drawn taut between the reader 25 and perforator 26 and consequently operates the taut-tape switch 6–TO–TT taut-tape relay 6–TT will be released. It should be pointed out at this time that in the particular printer used in this set the taut-tape switch 6–TO–TT also serves as an on/off switch for the reader and consequently the normal condition of taut-tape relay 6–TT is an energized condition when the set is in operation. Consequently, when the taut-tape switch 6–TO–TT is operated it will break the circuit to the taut-tape relay 6–TT causing it to release and close its contacts 6–TT–3. Since at this time in the operation the clear relay 3–CLR is energized a circuit will be completed from ground in FIG. 6 through the now closed break contacts 6–TT–3, now closed make contacts 6–3–CLR–4, closed break contacts 6–TTA and the winding of the relay 6–TTA to −48 volt DC source in FIG. 6. Upon being operated the relay 6–TTA will lock, operated over its own closed make contacts 6–TTA–6 and the closed make contacts 6–3–CLR–5.

The deenergization or release of the taut-tape relay 6–TT will open its make contacts 18–6–TT–12 thus to break the circuit to a transmitter distributor trip magnet 18–TDT momentarily since the clearing circuit is still in operation and make contacts 18–3–CLR–12 are still closed. In the normal operation of a magnet operated transmitter distributor such as that utilized in this transmitter set, the transmitter distributor trip magnet initiates an operation of the reader and through a contact mechanically operated in it, operates the feed magnet, such as the feed magnet 6–TDF to feed tape through the reader. Consequently, when the transmitter distributor trip magnet 18–TDT is not operated, the transmitter distributor feed magnet 6–TDF will normally not be operated.

With the taut-tape relay 6–TT released and the stepper switch control relay 15–C operated, a circuit will be completed to energize stepper switch and transmitter control relay 15–D in a circuit from ground (FIG. 15) through the now closed break contacts 15–6–TT–5, now closed make contacts 15–C–5, now closed break contacts 15–D–1 and the winding of the relay 15–D to −48 volt battery (FIG. 15). When relay 15–D is thus operated it will lock, operated through its own make contacts 15–D–1 and closed make contacts 15–A–6. The operation of relay stepper switch and transmitter control relay 15–D will break the locking circuit to control relay 15–C by opening break contacts 15–D–2 and the operation of relay 15–D in opening its break contacts 15–7–D–6 and 15–7–D–5 will blind distributor contacts 1 and 2 as shown in FIG. 7. Blinding of the distributor to any control by the keyboard contacts or reader contacts 1 and 2 as shown on FIG. 7, is thus accomplished by opening the connection between the distributor contacts 1 and 2 and the reader and keyboard contacts 1 and 2. In addition, when stepper switch and reader control relay 15–D is energized it will energize transmitter control relay 15–E by closing its make contact 15–D–4. The energization of the transmitter control relay 15–E will blind the distributor contacts 3 to 7 on FIG. 7 to any influence by the similarly numbered reader and keyboard contacts on FIG. 7 by opening the normally closed make contacts 15–7–E–2, 3, 4, 5 and 6. The energization of the stepper switch and transmitter control relays 15–D and 15–E will close the make contacts 7–15–D5 and 6 and 7–15–E–2, 3, 4, 5 and 6 to ground the distributor contacts 1 to 7 on FIG. 7.

With the release of taut-tape relay 6–TT, the locking path for stepper switch and transmitter control relay 15–B was broken at contact 15–6–TT–6. Consequently, when the control relays 15–D and 15–E place ground at one side of the distributor contacts 1 through 7 on FIG. 7, ground will be supplied through all of these contacts, sequentially, as is usual in transmitter distributors, through terminal RR on FIGS. 7 and 19 and thence through now closed break contact 19–15–B–1 and 19–15–C–1, through a now closed break contact 19–12–EOM to a selector magnet driver 19–SMD and thence to the −48 volt DC source in FIG. 19, to operate the selector magnet driver 19–SMD and cause the perforator to perforate levels 1 to 7 of the tape. It should be noted at this time that this operation is strictly a local one and that the perforator in perforating the levels 1 to 7 of the tape is isolated from the transmission line at now open make contacts 19–12–EOM–1 and 6.

Figure 9:
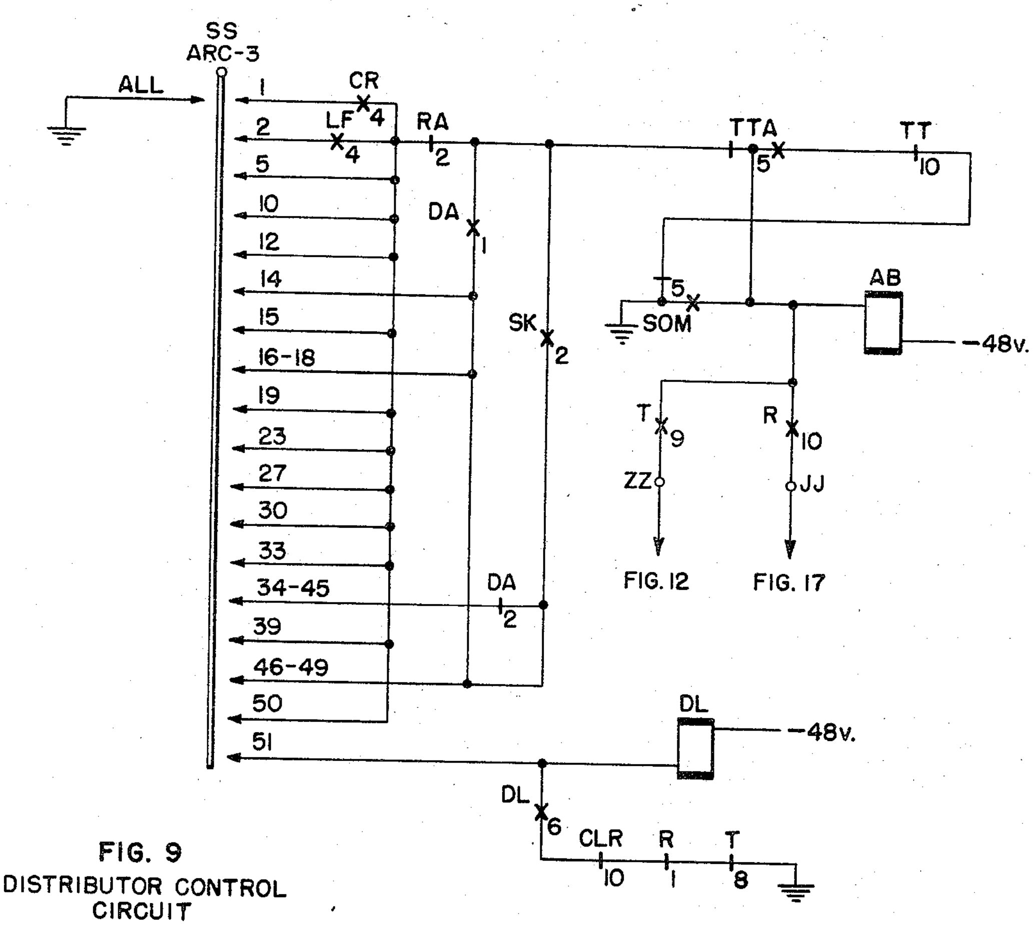
Figure 10:
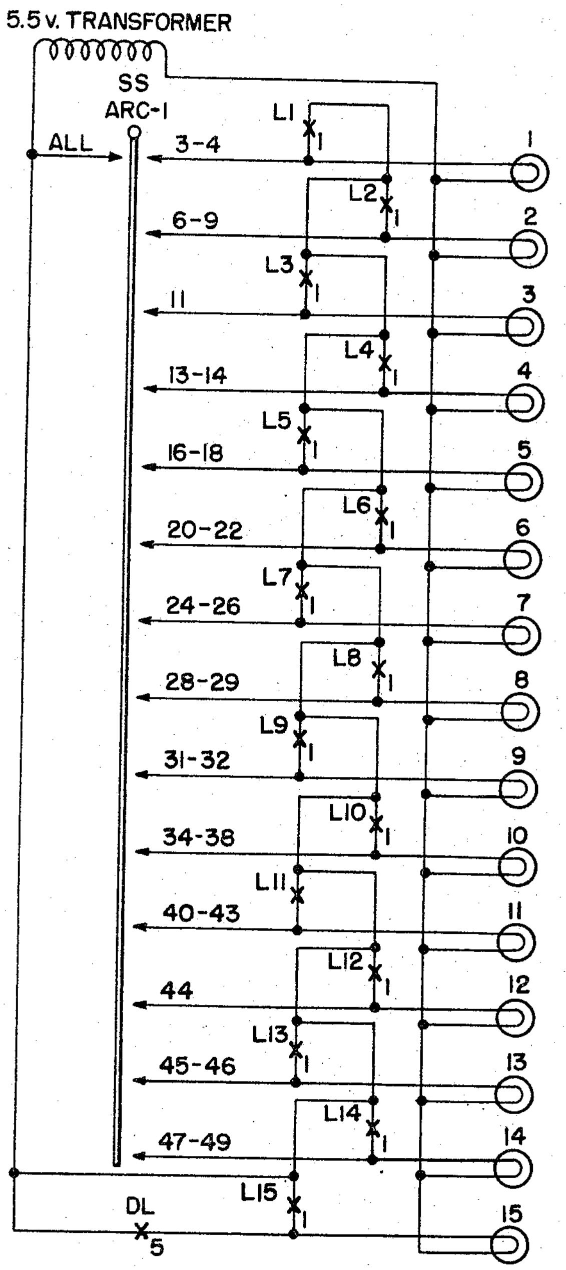

When taut-tape relay 6–TT release it closes its break contacts 9–6–TT–10 thereby to complete a circuit from ground in FIG. 9 through now closed break contact 9–4–SOM–5, now closed break contact 9–6–TT–10, now closed make contact 9–6–TTA–5, the winding of distributor control relay 9–AB to −48 volt AC source in FIG. 9. This will cause the energization of relay 9–AB.

The distributor control magnet 9–AB serves as an auxiliary tripping magnet for tripping the transmitter distributor and consequently when magnet 9–AB is energized the printer will go through one complete cycle. When this occurs the seven significant levels 1 to 7 of the distributor contacts will cause the perforator to punch all seven levels or "rub-out" in the tape. The perforator in its perforating and feeding operation will consequently create a slack condition in the tape which will result in the taut-tape relay 6–TT being operated due to the closure of contact 6–TO–TT. The main shaft of the printer has a cam controlled contact 5–PTR.AUX which operates once in each cycle of rotation. Under the conditions described thus far, the contacts 5–PTR.AUX will close repeatedly to feed pulses through now closed break contact 5–15–C–4, now closed make contacts 5–15–A–1 and thence through the winding of the stepper switch magnet 5–SS and stepper switch relay 5–SSA to −48 volt DC source in FIG. 5.

As soon as the taut-tape relay 6–TT was operated it broke the circuit to the magnet 9–AB by opening its contacts 9–6–TT–10 and operated the transmitter distributor trip magnet 18–TDT in a circuit from ground in FIG. 18 through closed make contacts 18–6–TT–12 and closed make contacts 18–3–CLR–12 through the winding of the trip magnet 18–TDT to the −48 volt DC source in FIG. 18. This condition will be maintained until the stepper switch driven by its magnet 5–SS reaches the home position. Thus the tape will be perforated with all significant code levels 1 to 7 to rub out any message or other information which may have been in this length of tape.

When the stepper switch brushes reach their home position, control relay 15–A will be released due to the opening of off-normal contact 15–5–SS.ON–2 and will in turn release relay 15–D by opening the locking circuit for it at contact 15–A–6 and relay 15–D in releasing will release relay 15–E by opening make contacts 15–D–4. The stepper switch on reaching its home position will close its contacts 4–5–SS.ON–4 to complete a circuit from ground in FIG. 4 through start-of-message relay 4–SOM and now closed break contact 4–15–E-1, 4–5–SS.ON–4, now closed make contact 4–6–TTA–2, and now closed break contacts 4–3–AS–1 and 4–15–B–4 to the −48 volt DC source in FIG. 4 thereby to energize the start-of-message relay 4–SOM. Since the clear relay 3–CLR had been locked energized through break contacts 3–4–SOM–2 this relay will release. When clear relay 3–CLR releases it will open the locking path to taut-tape relay A, 6–TTA by opening its make contacts 6–3–CLR–5 to release relay 6–TTA. When control relay 15–A was released it broke the path from the printer auxiliary contacts 5–PTR.AUX to stop the stepper switch 5–SS in its home position.

MESSAGE PREPARATION

The clearing of the apparatus and the placing of it in readiness to receive the message for transmission to the computer center is completed upon the release of the clear relay 3–CLR and when the start-of-message relay 4–SOM was operated as just described the auxiliary clutch tripping magnet 9–AB will again be energized by completing a circuit from ground in FIG. 9 through now closed make contacts 9–4–SOM–5, through the winding of the magnet 9–AB to −48 volt DC source in FIG. 9. When the relay 3–CLR released it opened the path to the transmitter tripping magnet 18–TDT by opening its make contacts 18–3–CLR–12. When the start-of-message relay 4–SOM operated and the clear relay 3–CLR released, the auxiliary contacts on the shaft of the printer in closing will complete a circuit from ground in FIG. 5 through now closed contacts 5–PTR.AUX, now closed break contacts 5–15–C–4, now closed make contacts 5–4–SOM–4, now closed break contacts 5–16–MS–2, 5–3–CLR–2 and the winding of relay 5–C1 to −48 volt source in FIG. 5. When the relay 5–C1 operates it will shunt relay 5–C2 by closing its make contacts 5–C1–1.

The energization of the start-of-message relay 4–SOM caused the closing of contacts 7–4–SOM–6 to place ground on the No. 1 distributor contact. Thus, on the stepping of the stepper switch 5–SS to tis home position, a start-of-message code comprising a marking pulse in the number 1 level will be sent locally by the distributor contacts to the perforator 26.

When in the course of rotation of the main shaft of the printer, the contacts 5–PTR.AUX reopen with relays 15–C and 4–SOM energized, the shunt around relay 4–C2 will be broken and this relay will be energized. Since the start-of-message relay 4–SOM had been held energized through the break contacts 4–5–C2–1 of control relay 5–C2, the start-of-message relay 4–SOM will be deenergized. The relays 5–C1 and 5–C2 will be locked operated at this time. As soon as the start-of-message relay 4–SOM releases it will release the auxiliary clutch tripping magnet 9–AB by opening its make contacts 9–4–SOM–5.

Figure 5:
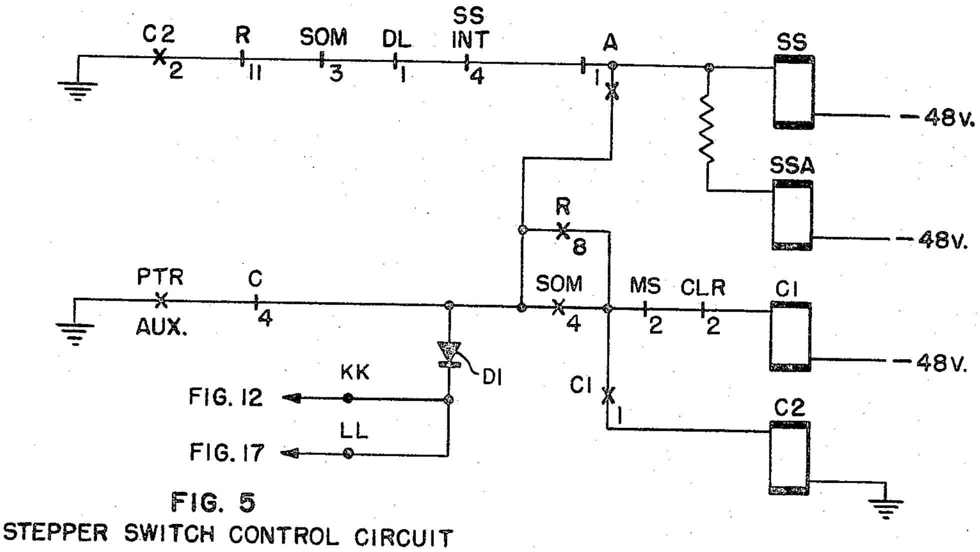
Figure 6:
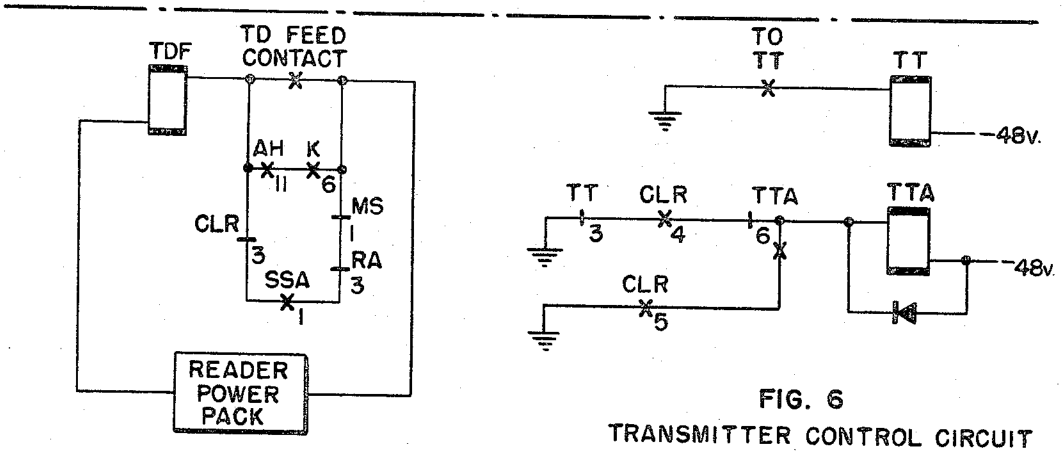

With the control relay 5–C2 energized, the stepper switch magnet 5–SS will be pulsed through its interrupter contact in a circuit from ground (FIG. 5) through the closed make contacts 5–C2–2, closed break contacts 5–17–R–11, 5–4–SOM–3, 5–9–DL–1 and the interrupter contacts 5–4–SS.INT–4 and closed break contacts 5–15–A–1 through the winding of the magnet 5–SS to −48 volt DC source in FIG. 5. As is known, in stepper switches of the type being used herein, the interrupter contact operates on each step of the switch and consequently the magnet 5–SS will be pulsed repeatedly until it returns to its normal position on Step 1. When the stepper switch 5–SS reaches its home position or Step 1, it will operate control relay 15–A by closing its make contact 15–5–SS.ON–2 to supply current to operate control relay 15–A over the circuit shown in FIG. 15. When control relay A is operated it will close its make contact 5–15–A–1 to transfer the control of the stepper switch magnet 5–SS to the printer auxiliary contacts 5–PTR.AUX.

Figure 17:
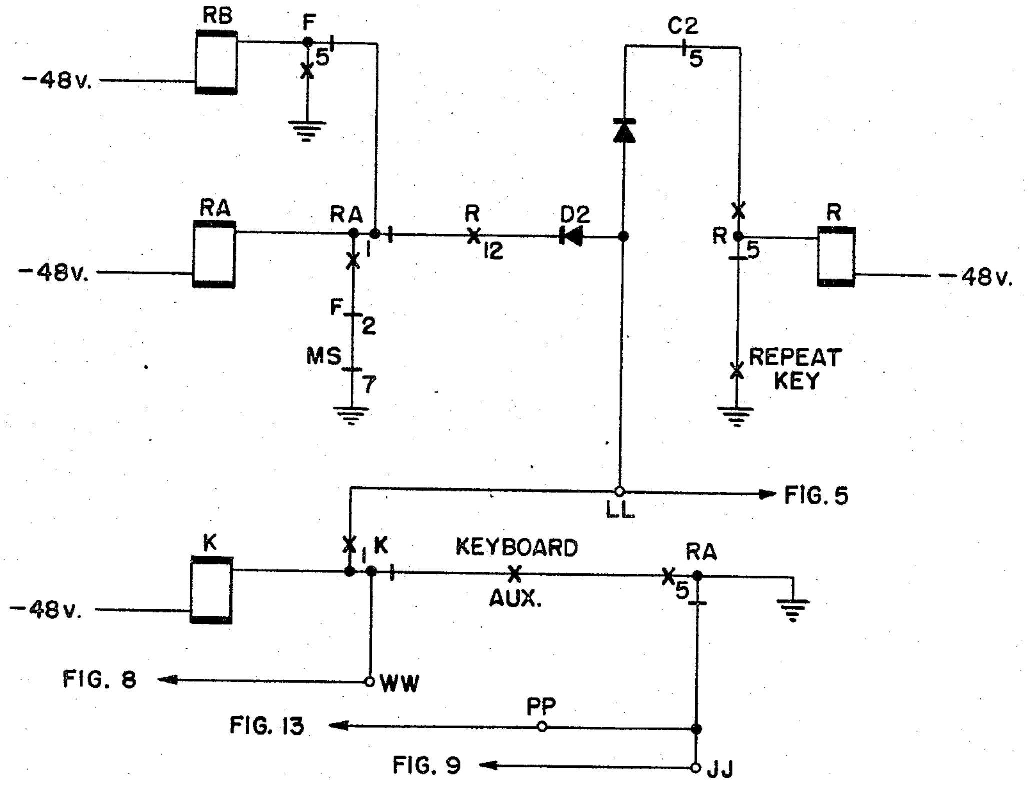

When the stepper switch arrives in its No. 1 position, it will complete a circuit from ground in FIG. 17 through now closed break contacts 17–RA–5, terminal PP on FIGS. 17 and 13 through the common brush for ARC–6 of the stepper switch in FIG. 13 and contact No. 1 of the stepper switch through the winding of carriage return relay 13–CR to −48 volt source in FIG. 13, thus to energize carriage return relay. The stepper switch on arriving at contact No. 1 will complete a circuit from ground at FIG. 9 through its common brush and SS.ARC–3, contact No. 1, now closed make contact 9–13–CR–4 of the carriage return relay CR–13, now closed break contact 9–17–RA–2, now closed break contact 9–6–TTA–5 and the winding of the distributor control relay 9–AB to −48 volt DC source in FIG. 9 to locally generate a carriage return operation of the monitor printer. This carriage return function of the monitor printer will be accomplished by placing ground on the distributor contacts 1, 3 and 4 shown on FIG. 7. This ground is supplied to distributor contact 1 by closing make contact 7–13–CR–1 which will connect ground (FIG. 7) through now closed break contact 7–17–R–6 to the distributor contact 1. Similarly, now closed make contacts 7–13–CR–6 and 7–13–SR–2 will supply ground to distributor contacts 3 and 4. As the distributor goes through its cycle these ground connections will be distributed sequentially through terminal RR on FIGS. 7 and 19 through now closed break contacts 19–15–B–1, 19–15–C–1 and 19–12–EOM–2 and the winding of selector magnet drive relay 19–SMD to −48 volt DC source in FIG. 19. The receiving distributor 31 (FIG. 20) will thus receive the permutation code signal for a carriage return function of the typing unit 32.

In a similar manner a line feed function will be performed by the monitor printer when the stepper switch is stepped to position No. 2 and this stepping will be effected by the printer auxiliary contact 5–PTR.AUX. The printer auxiliary contact 5–PTR.AUX will be operated as an incident to the operation of the monitor printer which will be initiated into operation by the operation of stepper switch control relay 5–SSA in closing its contacts 6–5–SSA–1 to complete the circuit to the transmitter distributor feed magnet 6–TDF. This circuit will be from one side of a power source through now closed break contact 6–16–MS–1, 6–17–RA–3, the now closed make contact 6–5–SSA–1 and now closed break contacts 6–3–CLR–3 through the winding of the transmitter distributor feed magnet 6–TDF to the other side of the power source.

When the printer auxiliary contacts 5–PTR.AUX close with control relay 15–A deenergized, a circuit will be completed from ground (FIG. 5) through the contacts 5–PTR.AUX, now closed break contact 5–15–C–4, now closed make contacts 5–15–A–1 and the winding of the stepper switch magnet to −48 volt DC source in FIG. 5. At this time this circuit will cause the stepper switch 5–SS to step from Position 1 to Position 2 at which point the stepper switch will cause the line feed function code combination to be transmitted to the local receiving distributor selector magnet and this circuit will be completed by 13–ARC–6 of the stepper switch, which will, in Position 2, complete a circuit from ground in FIG. 17 through now closed break contacts 17–RA–5, terminal PP on FIGS. 17 and 13 through the common brush 5–SS–ARC–6, contact 2 of that ARC, through the winding of the line feed relay 13–LF to −48 volt DC source in FIG. 13. When the line feed relay 13–LF is energized, it will close its contacts 7–13–LF–1 and 7–13–LF–6 to place ground on the distributor contacts 2 and 4 of the group of distributor contacts shown on FIG. 7. When this occurs the distributor, in its cycle of operation, will sequentially connect these two contacts 2 and 4 through terminal RR on FIGS. 7 and 19, now closed break contact 19–15–B–1, 19–15–C–1, 19–12–EOM–2 and the selector magnet driver 19–SMD to −48 volt DC in FIG. 19 to cause the monitor printer to perform a line feed function.

Thus on two successive signals of the printer the carriage return and line feed functions will be performed to prepare the printer to receive information pertinent to the request for transportation. As an incident to the cycle of the printer wherein the line feed function was accomplished the stepper switch 5–SS will be stepped to its third position in the same manner as described in connection with the stepping of it into Positions 1 and 2. When the stepper switch 5–SS steps from Position 1 to Position 2 the carriage return relay 13–CR will be deenergized at ARC–6 of the stepper switch on FIG. 13. Similarly, when the stepper switch 5–SS steps from Position 2 to Position 3 the circuit to the line feed relay 13–LF will be broken thus to release these relays sequentially.

The fact that the set is now in condition for the reception of a request for transportation will be indicated by the fact that the lamp associated with the No. 1 field key will be lighted. This operation is effected by 10–5–SS–ARC–1 of the stepper switch 5–SS, which is shown on FIG. 10, and which will supply current from its common brush 10–ALL through contact 3 and contact 4 to lamp No. 1 in the field indicator circuit shown on FIG. 10. The stepper switch 5–SS is in an off-normal condition at this time and, consequently, control relay 15–A will be energized due to the closure of the make contacts 15–SS.ON–2. Since at this time relay 9–AH is still locked operated, the reader contacts numbered 1 to 7 on the code reading circuit shown in FIG. 7 will be isolated from the distributor contacts 1 to 7 but these distributor contacts 1 to 7 may be controlled by the keyboard contacts 1 to 7 in the transmitter distributor 30. Since it is usual in printing telegraph transmitters for the operation of any character key in the keyboard to trip the transmitter and cause it to go through a single cycle, the printer auxiliary contacts 5–PTR.AUX will be operated each time a character key on the keyboard is operated to thus cause the stepper switch 5–SS to step one position each time the character key is operated under the conditions now present. After two character keys have been depressed on the keyboard, the stepper switch 5–SS will step to Position 5 and in Position 5 will complete a circuit from ground in FIG. 9 through the contact in Position 5 of 9–SS–ARC–3 to the common brush and then through the now closed break contacts 9–17–RA–2 and 9–6–TTA–5 and the winding of distributor control magnet 9–AB to −48 volt DC source in FIG. 9. This will trip the distributor in the same manner as described hereinbefore and cause a space function signal combination to be sent to the local or monitor printer and perforator since in Position 5 of the stepper switch 5–SS a circuit will be established from ground in FIG. 7 through common brush in position 5 to distributor contact No. 6 of the group of distributor contacts shown on FIG. 7 to transmit through terminal RR on FIGS. 7 and 19 and over the paths previously traced for transmitter signals to the selector magnet driver relay 19–SMD. This will cause a space signal to be fed from the distributor contacts of the transmitting distributor through the circuit logic to the receiving distributor and consequently the local or monitor printer will perform a spacing function thus to prepare field No. 2 for the reception of information relating to the flight number. It will be understood that the two characters transmitted from the keyboard 20 through the transmitting or sending distributor 30, circuit logic 34 and receiving distributor 31 to the typing unit 32 of the monitor printer would represent the air line on which transportation was sought and furthermore that this information would only be transmitted to the local or monitor printer and perforator 26 and not to the transmission line extending to the computer.

With the apparatus in the condition just described, the operator may keyboard the four digits of the flight number, on which passage is desired, in the same manner as described in connection with the keyboarding at the local agents set of the designation of the air lines. In keyboarding the four digits of the flight number the printer will print digits which will be perforated in the tape and as soon as the fourth digit has been keyboarded the stepper switch, which had been stepped each time the printer auxiliary contact 5–PTR.AUX was operated, will arrive in Position 10 where the spacing function will be generated from ground (FIG. 7) through the contact in Position 10 of 7–5–SS.ARC–5 and the common brush of this ARC of the stepper switch to the No. 6 distributor contact of the transmitting distributor. This will cause the lamp No. 3 in the field indicator circuit shown in FIG. 10 to be lighted as soon as the stepper switch steps into Position 11 due to the completion of a circuit from the transformer shown in FIG. 10 through the common brush to 10–5–SS.ARC–1 contact in Position 11 and through lamp No. 3 back to the other side of the transformer. This will indicate that the operator must now keyboard the class of the flight which he is attempting to schedule. This automatic spacing of the stepping switch will occur after the proper number of code combinations have been transmitted under keyboard control in each of the first nine fields of information since contacts 5, 10, 12, 15, 19, 23, 27, 30 and 33 of 7–5–SS.ARC–5 are strapped together. For a purpose to be described hereinafter, Positions 39 and 50 of 7–5–SS.ARC–5 are also strapped together with Position 5.

Thus far in the description of the operation of the keyboarding, it has been assumed that the operator or agent would enter two digits representative of the day of the month and three letters representative of the month of the year. However, in order to expedite the filling out of a request for transportation advantage is taken of the fact that the scheduling of most air line flights takes place either on the day the flight is to be scheduled or on the day before the flight is to be scheduled and therefore the keyboard is equipped with two keys designated "today" and "tomorrow," respectively. If either one of these keys 11–TMR or 11–TDY representative of tomorrow and today, respectively, are operated a single symbol will be transmitted by the agents set which will be recognized by the computer and consequently it is necessary to cause five additional space functions to be transmitted to the monitor printer and perforator in order to maintain the proper alignment of the various field segments in the message. Whenever one of the keys, 11–TMR or 11–TDY, is operated, it will complete a circuit from ground in FIG. 11 through now closed break contact 11–DA–5 and the winding of date relay 11–DA to −48 volt DC source in FIG. 11. This will cause the relay 11–DA to be energized and to lock energized through its own make contacts 11–DA–5, contacts 14 to 18 of ARC–4 of the stepper switch 11–5–SS–ARC–4 to a common brush on this ARC which is connected to ground. When the today key 11–TDY is operated it will cause the transmission of an asterisk which in the telegraph code being transmitted is marking in the second, fourth and sixth levels of the code. This is accomplished by so coding the keyboard that the operation of the today key, in addition to completing the circuit for causing the space code combination to be sent to the distributor contacts, will set the keyboard contacts in the same manner that the operation of the asterisk key on the keyboard would do and this is the closing of keyboard contacts as shown in the code reading circuit on FIG. 7, numbered 2, 4 and 6. Similarly, the symbol transmitted when the flight is scheduled for the day after the scheduling, that is, when the tomorrow key, 11–TMR, is operated, the code combination for dash will be transmitted since the tomorrow key on the keyboard has the same effect as operating the regular key for the dash symbol, that is, it will transmit a permutation code signal that is marking in the first, third, fourth and sixth levels.

When the stepper switch arrives in Position 14 it will complete a circuit from ground in FIG. 9 through its common brush and the contact at Position 14 through now closed make contacts 9–11–DA–1, now closed break contact 9–6–TTA–5 and the winding of the distributor control magnet 9–AB to the −48 volt DC source in FIG. 9 to trip the distributor as previously described. The relay 11–DA in operating will close its contacts 7–11–DA–4 to connect ground to the contact in Position 14 of 7–5–SS.ARC–5 and the common brush to transmit the space code through the distributor contact 6 on the code reading circuit in FIG. 7. The procedure for operating the keyboard for the other fields of information will be the same as the ordinary operation of a printing telegraph transmitter until the information in the nine fields under Segment Information have been printed by the typing unit 32 of the monitor printer and perforated in the tape 33.

RECORD LOCATOR OPERATION

Since some air lines require that they be informed of the names of the passengers that are to occupy space, by the air line which is attempting to set up a reservation on a foreign line and further since some of the air lines require information on the connecting flights which precede the leg of a flight that they are to schedule, a record locator field is provided in which the point of origin of a preceding leg of the flight may be entered, the flight number, the class of the flight, and the day of the month on which the flight is scheduled. Others of the air lines do not require this information and, consequently, means are provided for skipping this information if it is not required or providing the information in a compact form if it is desired. It should be borne in mind that in connection with the segment information which is required in connection with every transaction, (1) the line, (2) the flight, (3) the class, (4) the day, (5) the month, (6) the origin, (7) the destination, (8) the action (cancellation, purchase, etc.) and (9) the number of seats, there is allotted to these operation 31 spaces on the page being printed. Consequently, it becomes desirable to condense somewhat the space allotted to the record locator information on the printed page to allow for miscellaneous information, normally to appear on the same line with the segment information and record locator information. Where the record locator information comprising the information as to origin, the air line flight number, the class of service and day and month of a preceding leg of the trip is required, the agent or operator may keyboard this information and it will be printed on the page printer and perforated in the tape in the same manner as the segment information. However, the place of origin of the previous leg of the flight and the air line will be printed without spacing between them and then flight number, class of the flight, day of the month and month of the year will be printed without spacing between them.

Figure 11:
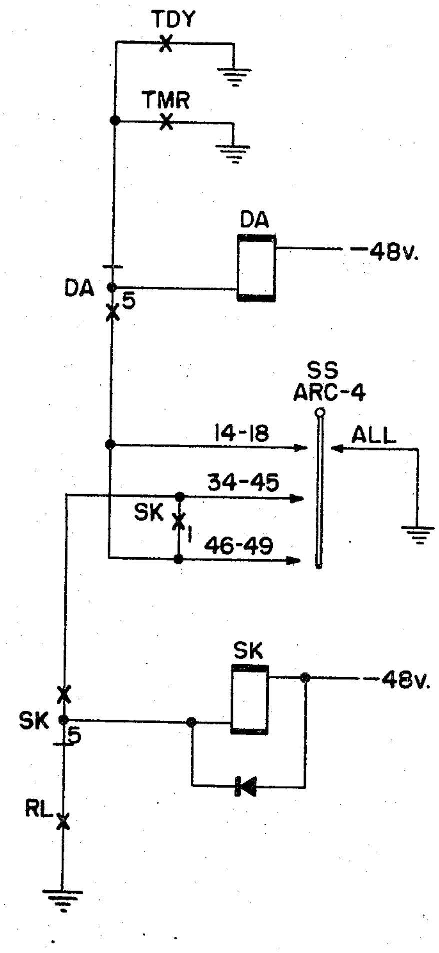
Figure 16:
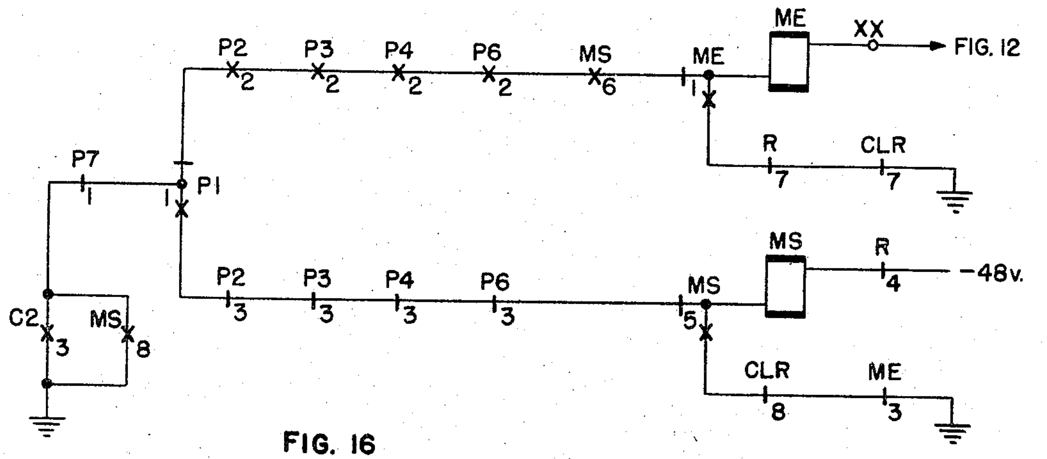

If the record locator information is not required, this field may be skipped by operating the record locator skip key RL which will cause the energization of the skip relay 11–SK by completing a circuit from ground through the record locator skip key 11–RL and the winding of the skip relay 11–SK to −48 volt DC source in FIG. 11. When the relay 11–SK is energized, after the number of seats in the segment information has been keyboarded, and the stepper switch 5–SS is in Position 34, the relay SK will remain locked operated through contacts 34 to 45 of ARC–4 of the stepper switch 11–5–SS.ARC–4 and the common brushes of this ARC to ground in FIG. 11. The operation of relay 11–SK will also close its contacts 11–SK–1 to maintain the relay energized through Positions 46 to 49 on the stepper switch in a circuit from ground through the common brush of ARC–4 of the stepper switch 11–5–SS.ARC–4, contacts 46 to 49, now closed make contacts 11–SK–1 and now closed make contacts 11–SK–5 through the winding of relay 11–SK to the −48 volt DC source in FIG. 11. With relay 11–SK energized it will close its contacts 9–11–SK–2 to supply ground in FIG. 9 through the common brush of 9–5–SS.ARC–3 and the contacts at Positions 34 to 45 of ARC–3 of the stepper switch 9–5–SS.ARC–2, now closed break contacts 9–11–DA–2, now closed make contact 9–11–SK–2, now closed break contact 9–6–TTA–5 and the winding of magnet 9–AB to −48 volt DC in FIG. 9 to cause the distributor to be tripped repeatedly.

When the stepper switch 5–SS arrives at Positions 46 to 49 on its various ARCs, ground will be supplied to the common brush of ARC–3 of the stepper switch at 9–5–SS.ARC–3 through the contacts in Positions 46 to 49 and the now closed contact 9–11–SK–2, now closed break contacts 9–6–TTA–5 and the winding of the magnet 9–AB to −48 volt DC source in FIG. 9 to trip the distributor as described hereinbefore to cycle the monitoring printer and the perforator 26.

The energization of the skip relay 11–SK will also close its make contacts 7–11–SK–3 to supply ground through the now closed break contacts 7–11–DA–3 to contacts 35 to 45 of ARC–5 of the stepper switch 7–5–SS.ARC–5 and will directly connect ground in FIG. 7 through now closed make contacts 7–11–SK–3 to contacts in Positions 46 to 49 of this same ARC of the stepper switch to place ground through the common brush of 7–5–SS.ARC–5 to the Number 6 distributor contact in FIG. 7. This will cause the generation of a space signal to step the printing unit across Positions 34 to 49 of the monitor printer and will also cause the perforating in the tape 33 of the space code combination.

Since, on each step of the stepper switch 5–SS, the relay 5–SSA operates together with the stepper switch magnet 5–SS tape will be fed through the reader 25 due to the repeated energization of the transmitter feed magnet 6–TDF consequent upon the closure of contact 6–5–SSA–1 as described hereinbefore. In being stepped through the reader the tape will close those reader contacts where it detects the presence of an aperture in the tape and upon the reading of the start-of-message code, which is marking in the No. 1 level of the tape and spacing in levels 2, 3, 4, 5, 6 and 7, the reader contacts will supply ground on FIG. 7 through their common connection and closed reader contact No. 1 to energize code reading relay 7–P1. This start-of-message code combination had been put into the tape upon the operation of the start-of-message relay 4–SOM as an incident to the initiation of the operation of the set by an agent. When code reading relay 7–P1 is energized and the remainder of the code reading relay 7–P2, 7–P3, 7–P4, 7–P6 and 7–P7 are not energized a circuit will be completed from ground in FIG. 16 through the now closed make contact 16–5–C2–3, the closed break contact 16–7–P7–1, now closed make contact 16–7–P1–1 and the closed break contacts 16–7–P2–3, 16–7–P3–3, 16–7–P4–3, 16–7–P6–3, 16–MS–5 and the winding of message start relay 16–MS and closed break contacts 16–17–R–4 to the −48 volt DC source. This will cause the energization of the message start relay 16–MS which will lock up through its own locking make contacts 16–MS–5 and the break contacts of the clear relay 16–3–CLR–8 and the now closed break contacts of the message end relay 16–ME–3 to ground in FIG. 16. This operation of the message start relay will occur at some undetermined time during the stepping of the transmitter distributor feed magnet and when it occurs it will break the holding path for control relay 5–C1 and 5–C2 by opening its break contacts 5–16–MS–2. The energization of the message start relay 16–MS will also open its break contacts 6–16–MS–1 to stop the reader by opening the circuit to the transmitter distributor feed magnet 6–TDF so that the reader will not operate under control of the stepper switch control circuit magnet 5–SSA. At this time the reader isolating relay 8–AH will also be released under control of the message start relay which will open its break contacts 8–16–MS–9.

Under the conditions just outlined the perforator 26 may continue to perforate tape but the reader 25 will be stopped and the operation of it will only be reinitiated if the message as typed on the monitor printer is to be transmitted or is to be corrected as will be described hereinafter. On the last cycle of operation of the skipping of the record locator field, the closing of the printer auxiliary contact 5–PTR–AUX will again energize stepper switch control magnet 5–SS to cause the stepper switch to step to Position 50 where a circuit will be completed at 9–5–SS–ARC–3 of the stepper switch, from ground (FIG. 9) through the common brush of 9–5–SS.ARC–3, contact 50, closed break contacts 9–17–RA–2 and 9–6–TTA–5 and winding of magnet 9–AB to the −48 volt DC source in FIG. 9. This will actuate the stepper switch 5–SS and printer one more time so that the stepper switch will arrive at Position 51 and the space signal will again be generated at 7–5–SS.ARC–5.

Under the conditions just described the typing unit will have stepped to the position where it will be in the "name" field so that the agent operating the set may now enter the passenger's name and any other miscellaneous information that is required.

Upon the operation of the first key on the keyboard after the typing unit has arrived in the "name" field, the closure of the contact 5–PTR.AUX, incident to the initiation of a printing cycle, will step the stepper switch 5–SS to its home position by completing a circuit from ground through closed contact 5–PTR.AUX, closed break contact 5–15–C–4, closed make contact 5–15–A–1 and the winding of magnet 5–SS to −48 volt D.C. in FIG. 5. As the stepper switch moved into Position 51 it completed a circuit from ground (FIG. 9) through its common brush to contact 51 of 9–5–SS.ARC–3 and through the winding of control relay 9–DL to −48 volt DC in FIG. 9 to energize this relay which will lock up through its own locking contact 9–DL–6 and now closed break contacts 9–3–CLR–10, 9–17–R–1 and 9–12–T–8 to ground.

The operation of the "transmit," "repeat" or "clear" key on the keyboard will have the same effect on the stepper switch as the operation of the first character key on the keyboard that is operated when the printer is in the "name" field, i.e., they will cause the switch to step to its home position. The stepping to the home position of the stepper switch 5–SS upon operation of the "transmit" key is effected as follows: Closure of the switch contacts 12–TRANS will connect ground in FIG. 12 through closed make contacts 12–16–MS–4, winding of the transmit relay 12–T and break contact 12–EOM–4 to −48 volt DC source to energize relay 12–T which will close its make contact 9–12–T–9 to complete a circuit from ground in FIG. 12 through now closed break contacts 12–GA–5, terminal ZZ on FIGS. 12 and 9, closed make contact 9–12–T–9 through the winding of the transmitter control magnet 9–AB to −48 volt DC source in FIG. 9. This operation of magnet 9–AB will trip the sending distributor 30 as described hereinbefore and the stepper switch will be stepped one step to its home position.

The operation of the "repeat" key will connect ground in FIG. 17 through break contact 17–R–5 and the winding of repeat relay 17–R to −48 volt DC in FIG. 17 to energize relay 17–R and to complete a circuit from ground in FIG. 17 through closed break contact 17–RA–5, terminal JJ on FIGS. 17 and 9, now closed make contact 9–17–R–10 through the winding of transmitter control magnet 9–AB to the −48 volt DC to initiate a cycle of the printer and thus cause the stepper switch 5–SS to step under control of the receiving distributor 31 through contact 5–PTR.AUX.

The operation of the "clear" key will cause the energization of relay 3–CLR to cause the stepper switch 5–SS to step to the home position as described in the section designated "Clearing Operation."

*Option 1.—Transmit*

After the agent operating the set has entered, on the monitor printer and perforated in the tape 33, all of the miscellaneous information regarding the passenger's name and other pertinent information and has checked the accuracy thereof by reading the matter printed by the typing unit 32, he may operate the "transmit" key 12–TRANS to initiate the transmission of the request for transportation over the signal line to the distant computer. The closure of the key 12–TRANS will energize the transmit relay 12–T in the manner just described and the energization of this relay will energize distributor control magnet 9–AB as also just described.

When distributor control magnet 9–AB is operated it will, as previously described, initiate a cycle of operation of the sending distributor 30. Since the relay 12–T is energized at this time ground will be placed on the distributor contacts numbered 2, 3, 4 and 6 on FIG. 7 with the result that the code combination for a period (.) will be generated, printed on the monitor by the typing unit 32 and perforated in the tape 33 by the perforator 26. The energization of the transmit relay 12–T will also open the locking path for relay 9–DL by opening break contact 9–12–T–8. On this cycle of the monitor printer, with relay 12–T operated, the closure of the contact 5–PTR.AUX will supply ground from FIG. 5 through now closed break contact 5–15–C–4, diode 5–D1, terminal KK on FIGS. 5 and 12, closed make contact 12–T–12, break contact 12–GA–6, winding of relay 12–GA and break contact 12–EOM–4 to −48 volt Dc source in FIG. 12 to energize relay 12–GA. Transmit relay 12–T will be released as soon as the printer controlled contact 5–PTR.AUX opens and relay 12–GA will be locked up over its locking make contact 12–GA–6.

When the relay 12–GA is energized it will close its make contact 12–GA–2 to energize a key release solenoid 12–FR which will release any of the field keys 22 (FIG. 1) which had been actuated. The energization of relay 12–GA will also cause the operation of an end-of-message relay 12–EOM by connecting ground in FIG. 12 through now closed make contact 12–GA–5, make contact 12–16–MS–3 of the message start relay 16–MS which is locked up, now closed break contacts 12–15–A–5, 12–9–DL–2 and 12–T–2 and the winding of relay 12–EOM to –48 volt DC source in FIG. 12. Relay 12–EOM in being energized will lock operated to ground in FIG. 12 over its make contact 12–EOM–3 and the now closed break contacts 12–3–CLR–6, 12–17–R–9 and 12–EOT, which last mentioned contacts are under control of clear relay 3–CLR, repeat control relay 17–R and a "stunt box" contact in the printer respectively. The "stunt box" in the printer is of the usual type which is actuated upon the receipt in the receiving distributor 31 of an assigned code combination or series of code combinations not used for regular functions of the printer.

MESSAGE TRANSMISSION

The operation of the end-of-message relay 12–EOM will cause the message which has been perforated in the tape 33 by the perforator 26 and typed on the monitor printer by the typing unit 32 to be transmitted over the signal line to the computer. This operation is initiated by the closure of make contacts 19–12–EOM–1 and 6 and the opening of break contact 19–12–EOM–2 which will close the circuit to the signal line and open the direct circuit to the selector magnet driver 19–SMD in the local agents set. The computer will have its selector magnet driver 19–SMD2 go to a spacing (no current) condition under control of the distributor contacts at the local set shown in FIG. 7, to initiate a computer cycle since the holding marking (current) condition is removed from it at break contacts 19–12–EOM–1 and 6.

When end-of-message relay 12–EOM is operated, it will break the circuit to relay 12–GA which had been held operated, by opening its break contacts 12–EOM–4 and relay 12–GA in releasing will close its break contact 18–12–GA–3 to complete a circuit to the transmitter distributor magnet 18–TDT. The circuit for operating the magnet 18–TDT will be completed from ground in FIG. 18 through now closed break contact 18–16–ME–4 of message end relay 16–ME, now closed make contacts 18–12–EOM–5 and 18–6–TT–11, now closed break contacts 18–12–GA–3, 18–17–RA–6 and 18–3–CLR–12 and the winding of the magnet 18–TDT to –48 volt DC source in FIG. 18. The transmitter distributor trip magnet 18–TDT will be held operated, under the just described conditions, to hold the reader 25 (FIG. 20) in continuous operation until all of the information perforated in the tape 33 is transmitted over the signal line to the computer. The tape 33 will be fed through the reader step-by-step each time the sending distributor 30 goes through a cycle due to the closing of the transmitter distributor feed contact 6–TDF under control of the trip magnet 18–TDT. The circuit to the trip magnet 18–TDT will be broken, after the message has been transmitted to the computer upon the reading of the code for (.) by the reader contacts 1 to 6 shown on FIG. 7 and positioned in the reader 25. This action, i.e. the stopping of the reader, will occur when the contacts numbered 2, 3, 4 and 6 of the reader contacts in FIG. 7, detect the code combination perforated in the tape 33 at the time transmit key 12–TRANS was operated.

When the reader contacts 2, 3, 4 and 6 detect the message end signal relays 7–P2, 7–P3, 7–P4 and 7–P6 will be energized in circuits from ground in FIG. 7 through the common lead to the reader contacts, closed reader contacts 2, 3, 4 and 6 and the windings of relays 7–P2, 7–P3, 7–P4 and 7–P6 to the –48 volt DC source at these relays to energize them. A circuit for energizing the message end relay 16–ME will be completed from ground in FIG. 16 through now closed make contact 16–MS–8, now closed break contacts 16–7–P7–1 and 16–7–P1–1, now closed make contacts 16–7–P2–2, 16–7–P3–2, 16–7–P4–2, 16–7–P6–2 and 16–MS–6, now closed break contact 16–ME–1, the winding relay 16–ME, terminal XX on FIGS. 16 and 12 and now closed make contact 12–EOM–4 to –48 volt DC source in FIG. 12.

Energization of the message end relay 16–ME will break the circuit to the transmitter distributor trip magnet 18–TDT by opening break contact 18–16–ME–4 to stop the reader 25. The energization of relay 16–ME will also release the holding circuit for the message start relay 16–MS by opening break contact 16–ME–3 and will operate a punch blinding magnet 14–PB by closing its contact 14–16–ME–2. This punch blinding magnet mechanically disables the perforator 26 so that it will not perforate the response from the computer in the tape 33.

The agents set, at this time, is neither transmitting nor preparing for transmission and will wait for a response from the computer to be received over the signal line. When the response is received the selector magnet driver 19–SMD will respond to the code signals and cause the response to be printed by the typing unit 32. Each response from the computer ends with a code combination signal which will cause the end of transmission contact 12–EOT to be opened thereby releasing the locking circuit which had held end-of-message relay 12–EOM operated. This will restore the agents set to its original condition where it is readily to be operated to send another request to the computer.

*Option 2.—Clear*

If, in operating the keyboard 20, the agent, originating a request for space, makes a mistake in entering information in any field of the message and detects such mistake by observing the matter printed by the typing unit 32, he may want to discard the prepared material. This may be done in either of two ways: (1) he may clear out all of the information which he has set up by operating the clear key shown on FIG. 3, or; (2) he may depress the field key or keys 22 in those areas where he has made a mistake. The clear option will be described in this section.

Figure 3:
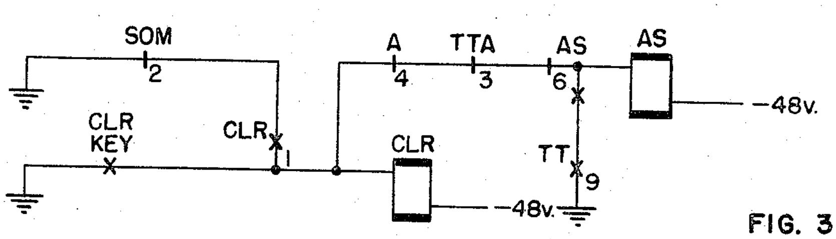

At any point in the preparation of the message for transmission prior to the operation of transmit key 12–TRANS, the clear key 3–CLR key may be operated to connect ground in FIG. 3 through the winding of clear relay 3–CLR to the –48 volt DC source. When relay 3–CLR is operated it will lock up through its own make contact 3–CLR–1 and the closed break contact 3–4–SOM–2.

In addition to operating the clear relay 3–CLR, the operation of the clear key 3–CLR key will complete a circuit from ground (FIG. 3) through now closed break contacts 3–15–A–4, 3–6–TTA–4, 3–AS–6 and the winding of the relay 3–AS to –48 volt DC source in FIG. 3; thus, to energize the relay 3–AS which will lock to ground through its make contacts 3–AS–6 and the now closed contact 3–6–TT–9 which, while shown as a make contact, is normally closed when the set is in use. When the relay 3–CLR is energized, it will open its break contacts 16–3–CLR–7 to break the locking path to the message end relay 16–ME.

With the clear relay 3–CLR operated and the taut-tape relay 6–TT operated, the transmitter distributor trip magnet 18–TDT will be operated in a circuit from ground in FIG. 18 through the closed make contacts 18–6–TT–12 and 18–3–CLR–12 through the winding of the magnet 18–TDT to the –48 volt DC source. This will initiate an operation of the sending distributor 30 as described hereinbefore. The relay 3–CLR in being energized will close a circuit to operate the stepper switch 5–SS and transmitter control relay 15–B by completing a circuit from ground (FIG. 15) through the now closed make contacts 15–3–CLR–9 and the now closed break contacts 15–A–2, 15–6–TTA–4 and 15–B–6 and the winding of the relay 15–B to the –48 volt DC source in FIG. 15. As described in connection with the first described clearing operation, the operation of the control relay 15–B will complete a circuit for operating the reader isolating relay 8–AH by closing the make contacts 8–15–B–5 and the reader isolating relay 8–AH will lock up through its locking make contacts 8–AH–8. When the relay 15–B is operated, it will complete a circuit to hold the selector magnet driver 19–SMD in a marking condition by connecting ground in FIG. 19 through its make contacts 19–15–B–1 and the now closed break contacts 19–15–C–1 and now closed break contacts 19–12–EOM–2 through the selector magnet driver 19–SMD to the −48 volt DC source in FIG. 19. This will hold the selector magnet driver 19–SMD in its normal or marking position, while tape is being fed through the reader 25 so that the selector magnet driver 19–SMD will have no effect on the receiving distributor 31 which would cause the typing unit 32 to print. As a consequence of this, the tape which had been perforated under control of the typing unit will be fed through the reader without influencing the reader 25 or transmitting anything to the line until the tape 33 is drawn taut between the perforator 26 and reader 25. When the tape becomes taut between the perforator 26 and reader 25 the taut-tape contact 6–TO–TT will be opened to release relay 6–TT which will in turn cause relay 6–TTA to be energized in a circuit from ground (FIG. 6) through the closed break contact 6–TT–3, now closed make contacts 6–3–CLR–4, now closed break contacts 6–TTA–6 and the winding of the relay 6–TTA to the −48 volt DC source.

The release of relay 6–TT will result in opening its contacts 3–6–TT–9 to break the locking circuit for the relay 3–AS and it will also result in the release of the control relay 15–B by opening its contact 15–6–TT–6. In addition the release of the taut-tape relay 6–TT will open its contacts 18–6–TT–12 to break the circuit to the transmitter distributor trip magnet 18–TDT. When the relay 6–TTA is energized, it will close its make contacts 4–6–TTA to complete the operating circuit to relay 4–SOM in the manner described hereinbefore and this will cause the start-of-message code combination to be fed to the distributor contacts shown in FIG. 7 due to the closure of the make contact 7–4–SOM–6 as described in connection with the previously discussed clearing operation. The clearing operation will then continue to restore the agents set to condition to receive a new message.

*Option 3.—Repeat*

In the event that the agent operating the set notices, upon checking the matter printed, by the monitor printer, that an error has been made in some one or more of the fields which have been entered in the tape 33 and printed by the typing unit 32, he may operate the field key or keys 22 for the field or fields in which the errors have occurred to prepare the set for corrections. This may be done either before transmission to the computer commences or after such transmission. Furthermore, it is possible that the agent has requested space on a flight which had all of its space reserved and as a consequence the computer has sent back such information. When this occurs the agent may want to request transportation on another flight of the same or a different air line or may desire to change any of the information in one or more of the fields originally sent to the computer.

When such situations occur the field key or keys 22 may be operated in the field or fields in which a change is to be made and then the repeat key shown on FIG. 17 may be operated. The operation of the repeat key will complete a circuit from ground in FIG. 17 through the key and break contact 17–R–5 and the winding of the relay 17–R to the −48 volt source. When the repeat key is operated, the repeat relay 17–R will lock up through its own make contact 17–R–5 and now closed break contact 17–5–C2–5 to the printer auxiliary contact through terminal LL on FIGS. 17 and 5 and the diode 5–D1, now closed break contact 5–15–C–4, now closed switch 5–PTR.AUX and ground in FIG. 5. The energization of the relay 17–R will also close a circuit to operate the magnet 9–AB in a circuit from ground in FIG. 17, now closed break contact 17–RA–5, terminal JJ on FIGS. 17 and 9, now closed make contact 9–17–R–10, through the winding of the distributor control magnet 9–AB to the −48 volt DC source in FIG. 9. As described previously, the operation of the distributor control magnet 9–AB will initiate a cycle of operation of the printer and as soon as the printer starts its contact 5–PTR.AUX will connect ground through now closed break contacts 5–15–C–4, now closed make contacts 5–17–R–8, now closed break contacts 5–16–MS–2 and 5–3–CLR–2 and the winding of the relay C1 to −48 volt DC source in FIG. 5. As described hereinbefore when relay 5–C1 is operated it will operate relay 5–C2 which will lock up through make contact 5–C1–1 to hold the relays 5–C1 and 5–C2 energized until either one of the break contacts 5–16–MS–2 or 5–3–CLR–2 is energized.

When in the cycle of operation of the printer, the contact 5–PTR.AUX opens, relay 17–R will be released since this relay was held energized through closed break contact 17–5–C2–5 and diode 5–D1 to the printer auxiliary contact 5–PTR.AUX. However, on the closure of the printer contact 5–PTR.AUX, relay 17–RA was energized before the release of relay 17–R in a circuit from ground in FIG. 5 through the closed contact 5–PTR.AUX, closed make contact 5–15–C4, diode 5–D1, terminal LL on FIGS. 5 and 17 through diode 17–D2, closed make contact 17–R–12 and closed break contact 17–RA–1 and the winding of the relay 17–RA to −48 volt DC source in FIG. 17. Simultaneously, with the energization of relay 17–RA, relay 17–RB will be energized over the same path through break contact 17–RA–1 and break contact 17–18–F–5 and the winding of the relay 17–RB to the −48 volt source in FIG. 17.

Since at this time control relay 5–C2 is energized, the stepper switch magnet 5–SS will be energized to step the stepper switch from its home position to its No. 1 position in a circuit from ground in FIG. 5 through now closed make contact 5–C2–2 and closed break contacts 5–17–R–11, 5–4–SOM–3, 5–9–DL–1, 5–SS.INT–4, and 5–15–A–1 through the winding of the stepper switch magnet 5–SS to the −48 volt source in FIG. 5. When relay 17–RA is operated the transmitter distributor feed magnet 6–TDF will be removed from control of the contact 6–5–SSA–1 due to the opening of the break contact 6–17–RA–3, therefore, the feed magnet 6–TDF for the transmitter distributor of the reader 25 will not operate at this time.

When the stepper switch moves into position No. 1 it will supply ground from FIG. 18 through its contacts 1 and 2 to the common brush of 18–SS.ARC–2 through the interrupter switch 18–SS.INT–2, now closed break contacts 18–17–R–3, now closed make contacts 18–17–RA–6, now closed break contacts 18–3–CLR–12 and the winding of the transmitter distributor trip magnet 18–TDT to the −48 volt source in FIG. 18. This will cause the transmitter distributor trip magnet to trip the sending distributor 30 and the transmitter distributor feed contact 6–TDF will operate to feed tape through the reader 25 and will also cause the reader to read the previously prepared length of tape up to the point where a field key 22 has been operated and to cause the printing by the typing unit 32 and perforating by the perforator 26 of the information in those fields which are being repeated. The relay 8–AH will not be operated at this time and consequently the information read by the reader contacts 1 to 8 on FIG. 7 will be sent to the distributor contacts 1 to 8 in the sending distributor 30 and to the receiving distributor 31 through the circuit logic 34. The tape will be stepped through the reader under control of the TD feed contact in FIG. 6 operating the transmitter distributor feed magnet 6–TDF. The transmitter distributor feed contact, as pointed out hereinbefore, is mechanically actuated each time the transmitter distributor trip magnet 18–TDT initiates a printing cycle of the monitor printer. The circuit for operating the transmitter distributor trip magnet 18–TDT will be supplied through the break contacts 18–L1, 18–L2 and the spacing stationary contacts of 18–SS.ARC–2 in Positions 5, 10, etc. up to the point where a field key 22 has been operated.

If it be assumed, for example, that the day of the month is to be changed, field key 22 in the "day" field will be operated. This key 22 controls the contact pair in the No. 4 field which is designated L4 on FIG. 18. When contacts L4 are opened as a consequence of the operation of the field key 22 for the day of the month the ground path to the common brush of stepper switch 18–SS.ARC–2 will be broken at now opened break contact L4 of the field key 22 for the "day" field and the transmitter distributor trip magnet 18–TDT will not be operated. When field key 22 in the "day" field is operated it will close contacts 10–L4. Consequently, when the stepper switch reaches Position 13, lamp No. 4 in the field indicator circuit shown in FIG. 10 will be lighted to indicate to the agent operating the set that information concerning the day of the month must be keyboarded into the message. This keyboard operation is exactly the same as the keyboard operation previously described and the stepper switch will be stepped once for each character entered into the "day" field of the message. Since the "day" field of the message comprises two characters, the entry of two digits into this field will, in stepping the stepper switch into Position 15, reinitiate the repetition of the information previously typed and perforated up to the point where another field key has been operated. If the change in the "day" field of the format pertaining to the segment information is the only correction to be made the apparatus will step through to the completion of the message and the transmit key in FIG. 12 may be operated to cause the transmission of the message to the computer in the same manner described hereinbefore in connection with the transmission of a message.

As the stepper switch moved into Position 15 and the first key 21 of the character keys was operated, a circuit was completed from ground in FIG. 17 through now closed make contact 17–RA–5 and the keyboard auxiliary contact, which is closed each time any character key 21 on the keyboard is operated, through the winding of relay 17–K to −48 volt battery. When this occurs relay 17–K will be energized and will lock energized through the printer auxiliary contact 5–PTR.AUX. When relay 17–K is energized it will close its contacts 8–17–K–4 to complete a circuit from ground in FIG. 8 through closed break contact 8–AH–8 and the winding of the reader isolating relay 8–AH to −48 volt DC source in FIG. 8 and relay 17–K will stay operated as long as the contact 17–KYBD–AUX is held operated and will lock operated in a path from ground in FIG. 5 through closed make contact 5–PTR.AUX, closed break contact 5–15–C–4, diode 5–D1, terminal LL on FIGS. 5 and 17, make contact 17–K–1 and winding of relay 17–K to the −48 volt DC source in FIG. 17. Relay 8–AH will be held operated in parallel with relay 17–K from closed make contact 17–K–1 through terminal WW on FIGS. 17 and 8 and closed make contact 8–17–RA–4. Thus, each time a character key in the keyboard is operated under the repeat conditions, relay 8–AH will block the information read by the reader 25 from controlling the sending distributor 30 by opening break contacts 7–8–AH–3, 4, 5, 6, 7, 12 and 9. In this manner, information may be keyboarded into those fields of the message format whose respective keys 22 have been depressed. After information has been keyboarded into those fields of the message format whose field keys 22 had been operated, the stepper switch 5–SS will step to its home position and the corrected message will appear in the tape and on the printed copy on the monitor printer.

The mode of operation described hereinbefore will apply to any of the fields within the segment information or record locator, that is, operation of any one of the first fourteen field keys 22 will cause the set to operate in the manner described hereinbefore. If a correction or change is to be made in field 15, that is, the "name" field, or "miscellaneous information" field a different mode of operation takes place.

When the stepper switch 5–SS arrives in Position 51 relay 9–DL in the distributor control circuit will be operated, in a circuit from ground in FIG. 9 through the common brush 9–5–SS.ARC–3, contact No. 51 and the winding of relay 9–DL to −48 volt battery in FIG. 9. At this time stepper switch 5–SS will return to its home position under control of the printer auxiliary contact 5–PTR.AUX. The operation of relay 9–DL will close its make contacts 18–9–DL–4 and with the field key 22, in the fifteenth field (the "name" key), operated, a circuit will be completed from ground in FIG. 18 through now closed make contacts 18–L15–2 and 18–9–DL–4 and the winding of relay 18–F to −48 volt DC source in FIG. 18 to energize this relay which will lock up from its own locking make contact 18–F–1 and the message start relay's now closed break contact 18–16–MS–11. Control relay 18–F in operating will break the locking circuit to transmit and repeat control relay 17–RA by opening its break contacts 17–18–F–2, thus releasing relay 17–RA. Also in operating, relay 18–F will close its make contacts 8–18–F–4 to supply ground through break contacts 8–AH–8 and the winding of reader isolating relay 8–AH–8 to −48 volt DC source in FIG. 8 to operate the relay 8–AH. This will open the path from reader contacts 1 to 7 on FIG. 7 in the reader 25 to the distributor contacts 1 to 7 in FIG. 7 of the sending distributor 30.

When relay 17–RA releases a circuit path will be established from ground in FIG. 18 through now closed make contact 18–9–DL–3, break contact 18–16–MS–12, make contacts 18–F–3, now closed break contacts 18–17–RA–6, and 18–3–CLR–12 and the winding of the transmitter distributor trip magnet 18–TDT to −48 volt DC source. This will cause the sending distributor 30 to go through a cycle of operation and will cause the stepper switch 5–SS to be stepped to its home position. Reader isolating relay 8–AH will now be locked operated from ground in FIG. 8 through now closed make contacts 8–18–F–6 and 18–17–RB–3, break contact 8–16–MS–9 and its own make contact 8–AH–8. In this manner the transmitter distributor trip magnet 18–TDT will be held energized until the message start relay 16–MS is operated to open its break contacts 18–16–MS–12 which will occur upon the detection by the reader 25 of the message start signal. The message start signal is detected through the message start chain circuit on FIG. 16 which becomes effective upon the detection by the reader of a perforation in the No. 1 level and no perforations in the other levels of the tape. Under this condition the tape 33 will be fed through the reader 25, the monitor printer will be cycled repeatedly causing the typing unit 32 to operate repeatedly without printing and without feeding any information to the perforator 26. This will discard all of the information which had been perforated in the tape in field 15 which covers the "name" field. In this manner the new section of tape being prepared will have nothing perforated in it in the area where the previous section had covered field 15 of the format up to the point where the reader 25 detects the presence of a perforation in the No. 1 level in the tape which had been put into the tape upon the operation of the "repeat key" shown on FIG. 17 and decsribed in connection with the initiation of the repeat operation. When the reader detects this code combination in the tape, the message start relay 16–MS will be operated in the same manner as described hereinbefore and relay 18–F will be released due to the opening of the break contact 18–16–MS–11. When relay 16–MS operates it will also open its contacts 5–16–MS–2 to release the stepper switch control relays 5–C1 and 5–C2. The circuit to the transmitter distributor trip magnet 18–TDT will also be opened due to the opening of trip contacts 18–16–MS–12.

At this point the changed or corrected information may be keyboarded into the sending distributor 30 to be typed by the typing unit 32 and perforated in the tape by the perforator 26. The field lamp No. 15 in the field indicator circuit of FIG. 10 will remain lighted until the information now in the tape 33 and printed on the monitor copy is to be transmitted or cleared from the set. If on inspection of the printed matter printed by the typing unit 32 in the monitor printer the agent wants to either transmit the information or to clear it all out of the set he may operate the transmit key 12–TRANS or the "clear key" in FIG. 3. If the transmit key is operated the message will be transmitted in the manner described hereinbefore and relay 9–DL will be released by the opening of break contact 9–12–T–8. The relay 9–DL will also be released if the clear key is operated due to the opening of the break contacts 9–3–CLR–10. With the operation of the transmit key 12–TRANS the message will be transmitted to the computer as described hereinbefore and with the operation of the "clear key" the agents set will be cleared for receipt of a new message. If the message is transmitted to the computer, a reply will be sent back to the agent set and the set will be restored to its normal condition ready to receive a new message.

Although a particular, specific embodiment of the invention is shown in the drawings and is described in the foregoing specification, the invention is by no means limited to that specific embodiment but may be modified by those skilled in the art without departing from the spirit and scope of the invention.

What is claimed is:

1. A printing telegraph transmitter set comprising:
(a) means for generating code combinations representative of characters to be transmitted,
(b) means for counting the characters generated by the generating means, and
(c) means controlled by said counting means for automatically generating a predetermined code combination after the generation of specific numbers of character signals without regard to the nature of the character signals.

2. A printing telegraph transmitter set comprising:
(a) means for entering a message on a monitor printer and for recording a duplicate of the message in permutation code in a tape,
(b) means for reading the code combinations in the tape,
(c) means for connecting the reading means to the printer to control the reprinting of the message by the printer and the re-recording of the message in the tape, and
(d) means associated with predetermined areas of a message as recorded by the monitor printer and settable for automatically disconnecting the reading means from the printer and reconnecting the printer to the message entering means when the reading means has completed the reading of the next preceding area of the message.

3. In a printing telegraph transmitter set:
(a) means for entering a message on a monitor printer,
(b) means for duplicating the message in coded form on a tape,
(c) means for reading the message from the tape,
(d) means for connecting the reading means to the printer to control the reprinting of the message by the printer and the reproducing of it in the tape, and
(e) field controlling means associated with discrete areas of a message as entered on the monitor printer including selectively settable elements for automatically disconnecting the reading means from the printer and reconnecting the printer to the message entering means when the reader has completed the reading of the portion of the message in the discrete area thereof which precedes the area associated with a selectively settable element which has been operated.

4. A printing telegraph transmitter set for transmitting a message in a fixed format having a predetermined different number of characters in some areas of the format comprising:
(a) a local monitoring page printer,
(b) means for controlling said printer to cause it to print a message which is to be transmitted in said format,
(c) a tape recorder for preparing a message tape simultaneously with the printing of the message to be transmitted,
(d) a tape reader for reading said tape and operable to control the local monitoring page printer to transmit the message, and
(e) control means selectively operable to repeat the printing by the printer of portions of the message under control of the tape reader and to suspend the reading by the tape reader while other portions of the message are changed under control of the means for controlling the printer, said selectively operable control means being operable to resume the repetition of a portion of the message under control of the tape reader after the controlling means for the printer has entered the changed portion in the message.

5. An automatic send-receive printing telegraph set including a keyboard and line signal controlled page printer, a tape recorder and a tape reader; in combination with control apparatus for controlling its mode of operation comprising:
(a) means for causing the recorder to record a tape with a permutation code duplicate of a message printed by the printer under control of the keyboard,
(b) a plurality of selectively operable field keys individually associated with discrete areas of a line of typing produced by the page printer,
(c) means controlled by said field keys for rendering the page printer responsive to either the keyboard or the tape reader within the discrete area of a line associated with each field key,
(d) means for automatically generating a spacing operation of said page printer consequent upon the completion of the typing under keyboard control of information in a discrete area.

6. The telegraph set according to claim 5 whrein means are provided for preventing the recorder from recording a duplicate of a portion of the message printed by the page printer under control of received line signals.

7. A printing telegraph transmitter set for transmitting a message in a fixed format having a predetermined different number of characters in some areas of the format comprising:
(a) a page printing monitor typing unit,
(b) a receiving distributor responsive to permutation code signals for controlling the typing unit,
(c) a tape recorder operable under control of the typing unit for recording permutation code combinations in a tape,
(d) a sending distributor for transmitting permutation code signals to control said receiving distributor and for controlling transmission over a telegraph line,
(e) a tape reader for reading the permutation code combinations from the tape to control the sending distributor,
(f) a keyboard for controlling the sending distributor,
(g) field keys individual to each area of the format, and
(h) means controlled by said field keys for causing the reader to control the sending distributor for selected areas of the format and for automatically switching the control of the sending distributor to the keyboard for other selected areas of the format to prepare a message for transmission.

8. The telegraph set according to claim 7 wherein the operation of a field key interrupts the control of the sending distributor by the reader when the typing unit is operating in the area associated with the operated field key.

9. The telegraph set according to claim 8 wherein means are provided for returning the sending distributor to the control of the reader after the typing unit moves out of the area associated with the operated field key.

10. A printing telegraph transmitter set according to claim 7 wherein means are provided to cause the reader to step each time the keyboard is operated after the control of the sending distributor has switched from the reader to the keyboard.

11. A printing telegraph transmitter set for transmitting a message in a fixed format having a predetermined different number of characters in some areas of the format comprising:

(a) a page printing monitor typing unit,
(b) a receiving distributor responsive to permutation code signals for controlling the typing unit,
(c) a tape recorder operable under control of the typing unit for recording permutation code combinations in the tape,
(d) a sending distributor for transmitting permutation code signals to control said receiving distributor and for controlling transmission over a telegraph line,
(e) a tape reader for reading the permutation code combinations from the tape to control the sending distributor,
(f) a keyboard for controlling the sending distributor,
(g) key controlled means for connecting said reader to the sending distributor to cause the typing unit and recorder to type and record a duplicate of the information previously typed and perforated under keyboard control, and
(h) field keys individual to each area of the format and operable to transfer control of the sending distributor from the reader to the keyboard when the typing unit arrives at an area of the format, the associated field key of which is operated.

12. A printing telegraph automatic send-receive set which includes:

(a) a page printing typing unit,
(b) a receiving distributor responsive to permutation code signals for controlling the typing unit,
(c) means for recording on a record medium the permutation code combinations of said signals,
(d) a sending distributor for transmitting permutation code signals to control said receiving distributor and for controlling transmission over a telegraph line,
(e) a reader for reading the permutation code combinations from the record medium to control the sending distributor,
(f) a keyboard also operable for controlling the sending distributor,
(g) a plurality of field keys, one individual to each of a plurality of areas in which the typing unit operates in printing a line on the page, and
(h) means operable to suspend control of the sending distributor by the reader in any area field key which is operated and to transfer such control to the keyboard while the typing unit is in such area.

13. A printing telegraph automatic send-receive set including (a) a page printing typing unit for printing a message text in a predetermined format arranged in spaced fields in a line of printing,
(b) a receiving distributor responsive to permutation code signals for controlling the typing unit,
(c) means for recording on a record medium the permutation code combinations of said signals,
(d) a sending distributor for transmitting permutation code signals to control said receiving distributor and for controlling transmission of said signals over a telegraph line,
(e) a reader for reading the permutation code combinations from the record medium to control the sending distributor, and
(f) a keyboard also operable for controlling the sending distributor; in combination with control means comprising
(g) a stepper switch moved a step each time a code combination is transmitted by said sending distributor,
(h) means controlled by said stepper switch for generating a spacing code combination after the generation of specific numbers of character signals by said sending distributor,
(i) a plurality of field keys each associated with a particular field in the line of printing being printed by the typing unit,
(j) a plurality of indicator lamps, one individual to each field key for indicating the field in which the typing unit is operating,
(k) a transmission control key,
(l) means controlled by said transmission control key for initiating operation of said reader to connect it to the sending distributor to transmit a message over the telegraph line,
(m) a repeat key,
(n) means controlled by said repeat key for connecting said reader to the sending distributor, and
(o) means actuated by an operated field key for transferring the control of the sending distributor from the reader to the keyboard when the typing unit moves into the field associated with the operated field key.

References Cited

UNITED STATES PATENTS

| | | | |
|---|---|---|---|
| 2,910,536 | 10/1959 | Barbeau et al. | 178—4.1 |
| 3,016,418 | 1/1962 | Young | 178—17 |
| 3,072,743 | 1/1963 | Rider et al. | 178—17 |
| 3,255,312 | 6/1966 | Howard | 178—17 |

NEIL C. READ, *Primary Examiner.*

THOMAS A. ROBINSON, *Examiner.*